United States Patent
Kato et al.

(10) Patent No.: US 10,447,687 B2
(45) Date of Patent: *Oct. 15, 2019

(54) COMMUNICATION TERMINAL, COMMUNICATION METHOD, AND COMMUNICATION SYSTEM

(71) Applicant: FELICA NETWORKS, INC., Tokyo (JP)

(72) Inventors: Shinichi Kato, Tokyo (JP); Michihiro Kuromoto, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,093

(22) Filed: Jan. 29, 2018

(65) Prior Publication Data
US 2018/0152437 A1    May 31, 2018

Related U.S. Application Data

(63) Continuation of application No. 15/332,251, filed on Oct. 24, 2016, now Pat. No. 9,912,658, which is a (Continued)

(30) Foreign Application Priority Data

Dec. 3, 2012 (JP) ................ 2012-264136

(51) Int. Cl.
*H04L 9/32* (2006.01)
*H04L 29/06* (2006.01)
(Continued)

(52) U.S. Cl.
CPC .......... *H04L 63/083* (2013.01); *G06Q 20/20* (2013.01); *G06Q 20/32* (2013.01); *G06Q 20/388* (2013.01);
(Continued)

(58) Field of Classification Search
CPC ... H04L 63/083; H04L 63/0428; H04L 63/06; H04L 63/0853; H04L 63/0884;
(Continued)

(56) References Cited

U.S. PATENT DOCUMENTS 9,033,226 B1 * 5/2015 Gazdzinski ............ G06Q 10/08
235/383
2005/0251431 A1    11/2005 Schmidtberg
(Continued)

FOREIGN PATENT DOCUMENTS

JP    10-327142 A    12/1998
JP    2001-283325 A    10/2001
(Continued)

OTHER PUBLICATIONS

Office Action for JP Patent Application No. 2012-264136, dated Feb. 6, 2018, 27 pages of Office Action.
(Continued)

*Primary Examiner* — Mohammad W Reza
(74) *Attorney, Agent, or Firm* — Chip Law Group

(57) ABSTRACT

There is provided a communication terminal including a transmission controller configured to allow transmission of, to a verification target device, authentication information for authenticating the verification target device based on first information acquired from an information processing device, and a verification unit configured to verify validity of the verification target device based on a response to the authentication information and second information acquired from the information processing device, the second information being associated with the first information.

16 Claims, 16 Drawing Sheets

Related U.S. Application Data continuation of application No. 14/089,132, filed on Nov. 25, 2013, now Pat. No. 9,509,687.

(51) Int. Cl.
    *G06Q 20/32*     (2012.01)
    *G06Q 20/38*     (2012.01)
    *G06Q 20/20*     (2012.01)

(52) U.S. Cl.
    CPC .......... *H04L 63/0428* (2013.01); *H04L 63/06* (2013.01); *H04L 63/0853* (2013.01); *H04L 63/0884* (2013.01); *H04L 63/107* (2013.01)

(58) Field of Classification Search
    CPC ...... H04L 63/107; G06Q 20/20; G06Q 20/32; G06Q 20/388
    USPC ........................................................ 713/168
    See application file for complete search history.

(56) References Cited

U.S. PATENT DOCUMENTS

| | | | |
|---|---|---|---|
| 2006/0143478 A1 | 6/2006 | Morino et al. | |
| 2007/0264965 A1 | 11/2007 | Taniguchi | |
| 2007/0294524 A1 | 12/2007 | Katano | |
| 2012/0030426 A1 | 2/2012 | Satran | |
| 2012/0253973 A1* | 10/2012 | Harter | H04W 4/023 705/26.9 |
| 2013/0012226 A1* | 1/2013 | Leclercq | G01S 5/02 455/456.1 |
| 2013/0159186 A1* | 6/2013 | Brudnicki | G06Q 20/227 705/44 |

FOREIGN PATENT DOCUMENTS

| | | |
|---|---|---|
| JP | 2003-044436 A | 2/2003 |
| JP | 2003-198541 A | 7/2003 |
| JP | 2005-339179 A | 12/2005 |
| JP | 2005-339179 A1 | 12/2005 |
| JP | 2008-027235 A | 2/2008 |
| JP | 2009-188512 A | 8/2009 |
| JP | 2011-503977 A | 1/2011 |
| JP | 2011-061478 A | 3/2011 |
| JP | 2012-171458 A | 9/2012 |

OTHER PUBLICATIONS

Notice of Allowance for U.S. Appl. No. 15/332,251, dated Oct. 20, 2017, 08 pages.
Non-Final Office Action for U.S. Appl. No. 15/332,251, dated Jun. 27, 2017, 14 pages.
Notice of Allowance for U.S. Appl. No. 14/089,132, dated Jul. 20, 2016, 19 pages.
Final Office Action for U.S. Appl. No. 14/089,132, dated Jan. 15, 2016, 09 pages.
Non-Final Office Action for U.S. Appl. No. 14/089,132, dated Jul. 2, 2015, 11 pages.
Office Action for JP Patent Application No. 2012-264136, dated Jun. 22, 2017, 02 pages of Office Action and 02 pages of English Translation.
Office Action for JP Patent Application No. 2012-264136, dated Jan. 31, 2017, 15 pages.
Office Action received for JP Patent Application No. 2012-264136, dated Aug. 2, 2016, 11 pages of office action.
Office Action for JP Patent Application No. 2017-085320, dated Jun. 26, 2018, 12 pages of Office Action and 07 pages of English Translation.

\* cited by examiner

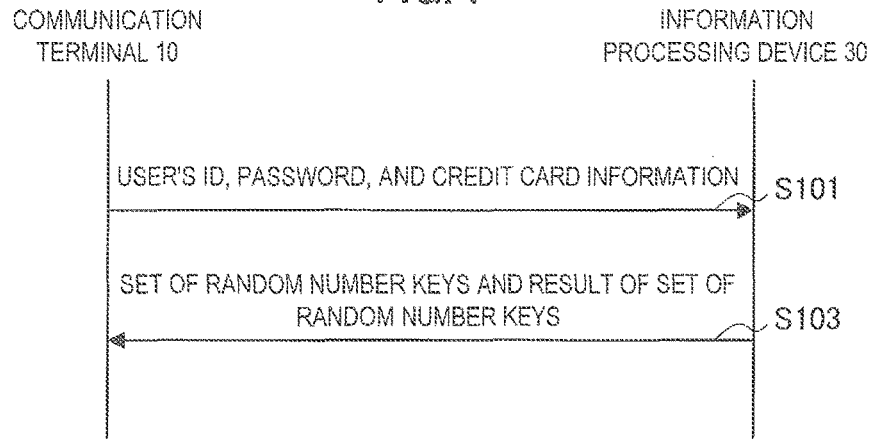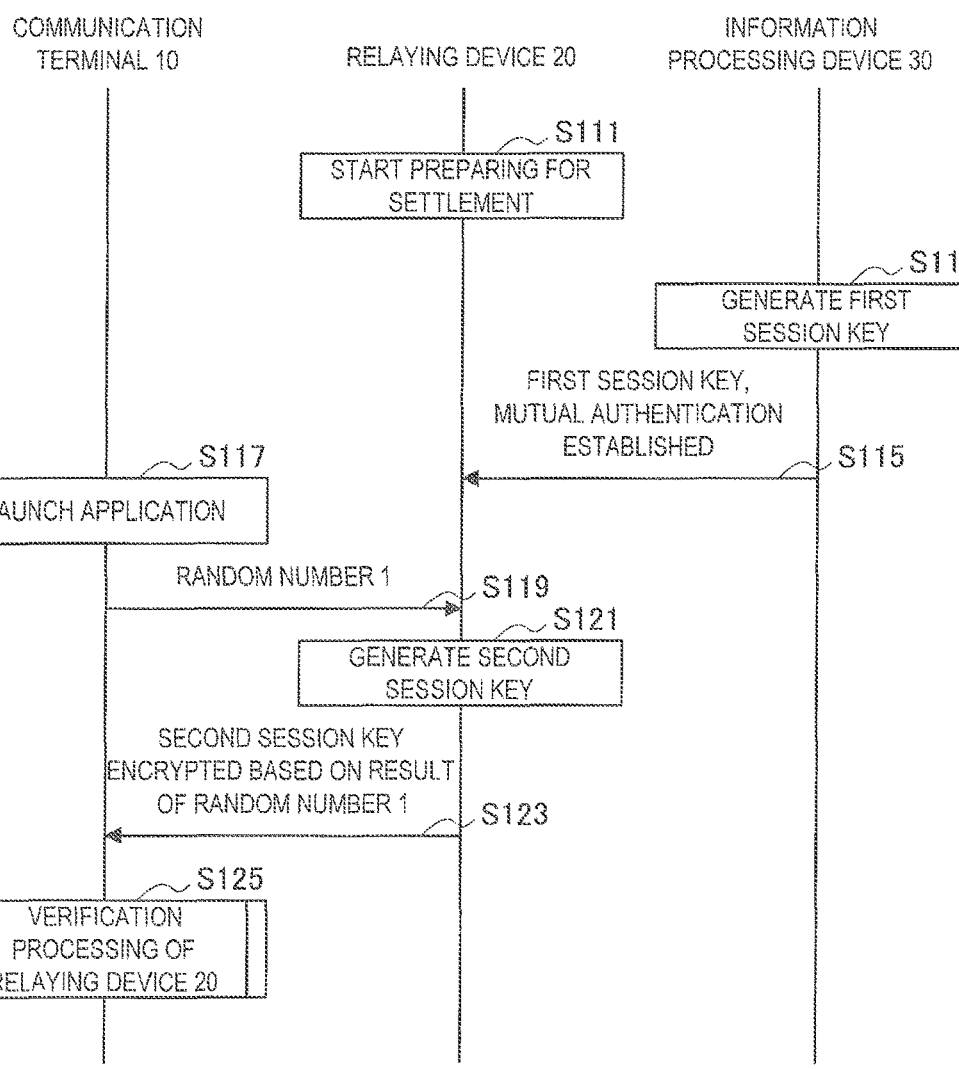

COMMUNICATION TERMINAL, COMMUNICATION METHOD, AND COMMUNICATION SYSTEM

CROSS REFERENCE TO RELATED APPLICATIONS

The present application is a continuation application of U.S. patent application Ser. No. 15/332,251, filed Oct. 24, 2016, which is a continuation application of U.S. patent application Ser. No. 14/089,132, filed Nov. 25, 2013, and claims the benefit of Japanese Priority Patent Application JP 2012-264136 filed Dec. 3, 2012, the entire contents of which are incorporated herein by reference.

BACKGROUND

The present disclosure relates to a communication terminal, a communication method, a program, and a communication system.

In recent years, techniques for exchanging various pieces of information between communication devices, such as electronic business transaction systems and electronic money systems, have become common. Such communication techniques enable users to easily execute processing, such as settlement.

On the other hand, systems using such communication techniques often involve exchange of personal information, for example. Accordingly, information exchanged between communication devices might be a target of wiretap for another device. Against such a background, a variety of techniques have been proposed in order to achieve communication with high security.

For example, JP 2003-044436A discloses a technique of executing the following three-stage authentication processing: individual authentication of a user by an individual terminal; mutual authentication between a server and the individual terminal; and individual authentication of the user by the server.

SUMMARY

However, in the related art, since it is not checked whether a device of a communication target itself is an unauthorized device, communication information might be used in an unauthorized manner or leaked, for example, depending on the device of the communication target. Accordingly, the validity of the device of the communication target is not checked sufficiently in the related art.

According to one or more embodiments of the present disclosure, there is provided a novel and improved communication terminal, communication method, program, and communication system which enable checking of the validity of the device of the communication target.

According to an embodiment of the present disclosure, there is provided a communication terminal including a transmission controller configured to allow transmission of, to a verification target device, authentication information for authenticating the verification target device based on first information acquired from an information processing device, and a verification unit configured to verify validity of the verification target device based on a response to the authentication information and second information acquired from the information processing device, the second information being associated with the first information.

According to another embodiment of the present disclosure, there is provided a communication method including allowing transmission of, to a verification target device, authentication information for authenticating the verification target device based on first information acquired from an information processing device, and verifying validity of the verification target device based on a response to the authentication information and second information acquired from the information processing device, the second information being associated with the first information.

According to another embodiment of the present disclosure, there is provided a communication method including allowing, by a communication terminal, transmission of, to a verification target device, authentication information for authenticating the verification target device based on first information acquired from an information processing device, verifying, by the communication terminal, validity of the verification target device based on a response to the authentication information and second information acquired from the information processing device, the second information being associated with the first information, allowing, by the communication terminal, the information processing device to transmit information for executing predetermined processing to the verification target device when it is verified that the verification target device is authorized, and allowing, by the verification target device, transmission of the information for executing predetermined processing to the information processing device.

According to another embodiment of the present disclosure, there is provided a program for causing a computer to function as a transmission controller configured to allow transmission of, to a verification target device, authentication information for authenticating the verification target device based on first information acquired from an information processing device, and a verification unit configured to verify validity of the verification target device based on a response to the authentication information and second information acquired from the information processing device, the second information being associated with the first information.

According to another embodiment of the present disclosure, there is provided a communication system including a communication terminal, a verification target device, and an information processing device. The communication terminal includes a transmission controller configured to allow transmission of, to the verification target device, authentication information for authenticating the verification target device based on first information acquired from the information processing device, and a verification unit configured to verify validity of the verification target device based on a response to the authentication information by the verification target device and second information acquired from the information processing device, the second information being associated with the first information. The transmission controller allows the information processing device to transmit information for executing predetermined processing to the verification target device when the verification unit verifies that the verification target device is authorized. The verification target device includes a transmission controller configured to allow transmission of the information for executing predetermined processing to the information processing device.

According to another embodiment of the present disclosure, there is provided a communication system including a communication terminal, a verification target device, and an information processing device. The communication terminal includes a transmission controller configured to allow transmission of, to the verification target device, authentication information for authenticating the verification target device based on first information acquired from the information processing device, and a verification unit configured to verify validity of the verification target device based on a response to the authentication information by the information processing device and second information acquired from the information processing device, the second information being associated with the first information. The transmission controller allows the information processing device to transmit information for executing predetermined processing to the verification target device when the verification unit verifies that the verification target device is authorized. The verification target device includes a transmission controller configured to allow transmission of the authentication information and the information for executing predetermined processing to the information processing device.

As described above, according to one or more embodiments of the present disclosure, it is possible to check the validity of the device of the communication target.

BRIEF DESCRIPTION OF THE DRAWINGS

FIG. 7 is a sequence diagram showing operations before settlement according to the same embodiment;

FIG. 8 is a first sequence diagram showing operations at a time of settlement according to the same embodiment;

DETAILED DESCRIPTION OF THE EMBODIMENT(S)

Figure 1:
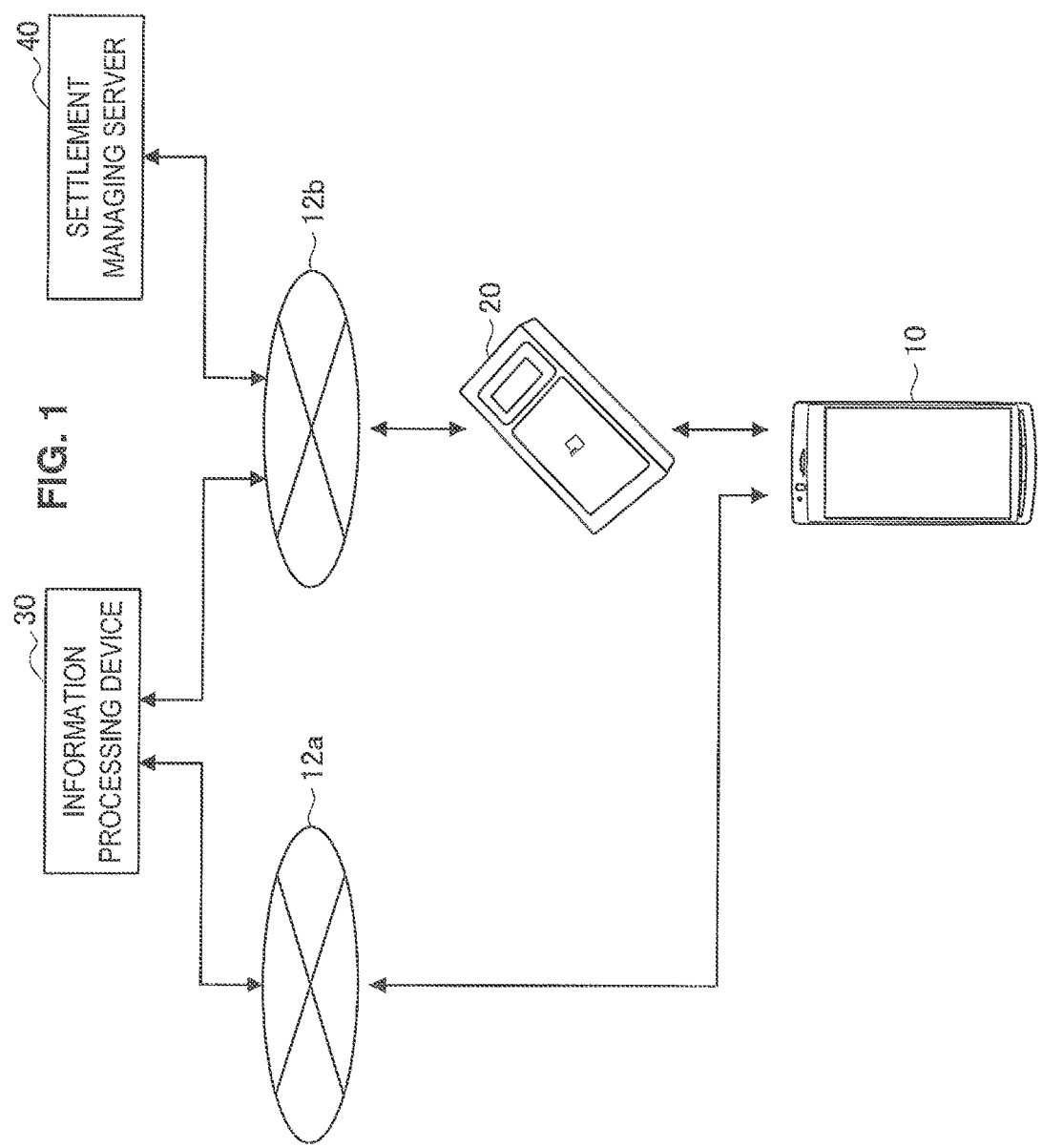
FIG. 1 is a view for describing a configuration of an information processing system according to each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of structural elements having substantially the same function and structure may be distinguished from each other by adding different alphabetical characters after the same reference numeral. For example, a plurality of structural elements having substantially the same function and structure are distinguished by being referred to as "communication network 12a" and "communication network 12b", as necessary. Note that when it is unnecessary to distinguish the structural elements having substantially the same function and structure, only the same reference numeral is used. For example, when it is unnecessary to distinguish the communication network 12a and the communication network 12b, both are simply referred to as "communication network 12".

Further, DETAILED DESCRIPTION OF THE EMBODIMENT(S) will be described in the following order.
1. Basic configuration of a communication system
2. Summary of the present disclosure
3. Detailed description of each embodiment
3-1. First embodiment
3-2. Second embodiment
3-3. Third embodiment
4. Modification example 1. Basic Configuration of a Communication System The present disclosure can be implemented in a variety of embodiments as described in detail in 3-1. First embodiment to 3-3. Third embodiment as examples. Further, a communication terminal 10 (communication terminal) according to each embodiment of the present disclosure includes, for example, A. a transmission controller 104 configured to allow transmission of, to the verification target device, authentication information for authenticating the verification target device based on first information acquired from an information processing device 30 (information processing device); and B. a verification unit 108 configured to verify the validity of the verification target device based on a response to the authentication information and second information acquired from the information processing device 30, the second information being associated with the first information.

As described later in detail, the communication terminal 10 according to each embodiment of the present disclosure allows transmission of, to the verification target device, the authentication information for authenticating the verification target device based on the first information acquired from the information processing device 30. Further, the communication terminal 10 verifies the validity of the verification target device based on the response to the authentication information and the second information acquired from the information processing device 30, the second information being associated with the first information. Accordingly, since the communication terminal 10 can authenticate the verification target device based on the first and second information acquired from the information processing device 30, it is possible to determine whether the verification target device is an unauthorized device.

Here, the verification target device is a device of a communication target of the communication terminal 10. For example, the verification target device may be a later-described relaying device 20 according to each embodiment of the present disclosure or another device.

In the following, a basic configuration of a communication system common to the embodiments of the present disclosure will be described with reference to FIG. 1. Note that in this specification below, an example in which the communication system according to each embodiment of the present disclosure is applied to a settlement system, such as a point of sales (POS) system, will be mainly described. However, the communication system according to each embodiment of the present disclosure is not limited to this example, but can be applied to any other usage. For example, the communication system according to each embodiment of the present disclosure may be applied to a ticket selling system at a theater, or to a coupon issuing system which issues Web coupons.

As shown in FIG. 1, the communication system according to each embodiment of the present disclosure includes the communication terminal 10, the communication network 12, the relaying device 20, the information processing device 30, and a settlement managing server 40.

(Communication Terminal 10)

Figure 2:
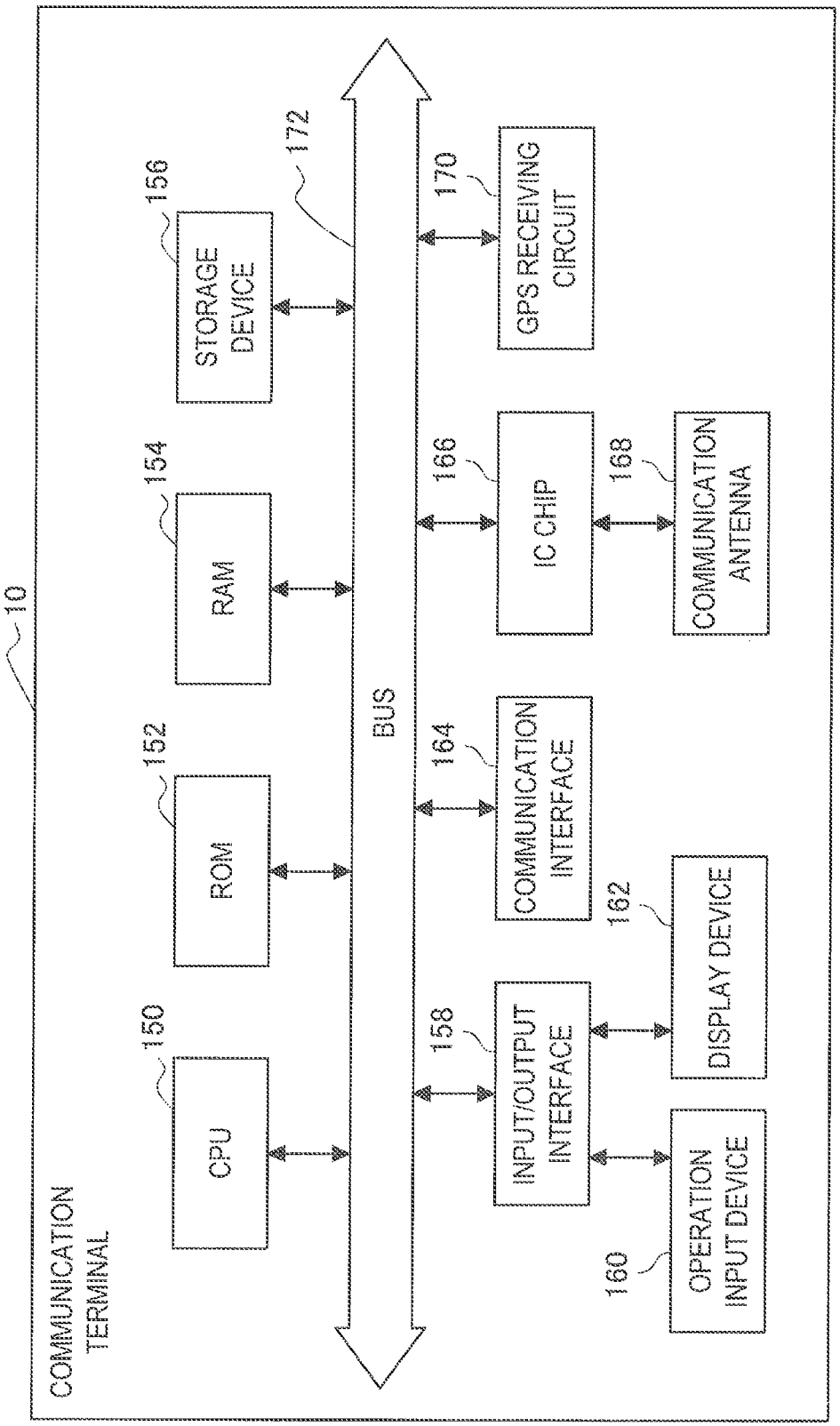
FIG. 2 is a view for describing a hardware configuration of a communication terminal according to each embodiment of the present disclosure.

The communication terminal 10 is, for example, a communication terminal used by a user coming to a store where the relaying device 20 is installed. The communication terminal 10 has a hardware configuration shown in FIG. 2, for example. As shown in FIG. 2, the communication terminal 10 includes, for example, a central processing unit (CPU) 150, read only memory (ROM) 152, random access memory (RAM) 154, a storage device 156, an input/output interface 158, an operation input device 160, a display device 162, a communication interface 164, an IC chip 166, a communication antenna 168, and a global positioning system (GPS) receiving circuit 170. Further, the communication terminal 10 connects structural elements to each other with a bus 172 as a transmission path of data, for example.

The CPU 150, for example, includes a variety of processing circuits and functions as a controller 102 which controls the entire communication terminal 10. Further, the CPU 150 in the communication terminal 10 serves as, for example, the transmission controller 104, an authentication information generating unit 106, the verification unit 108, and an encryption/decryption function unit 114, which will be described later.

The ROM 152 stores data for control and the like, such as programs and arithmetic parameters, which are used by the CPU 150. The RAM 154 temporarily stores programs and the like executed by the CPU 150, for example.

The storage device 156 functions as a later-described storage 120 and stores various data such as setting information and applications. Here, examples of the storage device 156 include a magnetic storage device, such as a hard disk, and a nonvolatile memory, such as a flash memory. Further, the storage device 156 may be detachably attached to the communication terminal 10.

The input/output interface 158 connects, for example, the operation input device 160 and the display device 162. The operation input device 160 functions as a later-described input unit 112, and the display device 162 functions as a later-described display unit 110, for example. Here, examples of the input/output interface 158 include a universal serial bus (USB) terminal, a digital visual interface (DVI) terminal, a high-definition multimedia interface (HDMI) terminal, and a variety of processing circuits. Further, the operation input device 160 is, for example, provided on the communication terminal 10 and connected to the input/output interface 158 in the inside of the communication terminal 10. Examples of the operation input device 160 include a button, a direction key, a rotational selector, such as a jog dial, and a combination thereof. Further, the display device 162 is, for example, provided on the communication terminal 10 and connected to the input/output interface 158 in the inside of the communication terminal 10. Examples of the display device 162 include a liquid crystal display and an organic EL display.

Note that the input/output interface 158 can be connected to an external device, such as an operation input device (e.g., a keyboard or a pointing device) or a display device as an external device of the communication terminal 10. Further, the display device 162 may be a device with which display and user's operations are possible, such as a touch screen.

The communication interface 164 is a communication means included in the communication terminal 10 and functions as a later-described first communication unit 100 for wired/wireless communication with an external device, such as the information processing device 30, via the communication network 12a (or directly). Here, examples of the communication interface 164 include a set of a communication antenna and a radio frequency (RF) circuit (wireless communication), a set of an IEEE 802.15.1 port and a transmission/reception circuit (wireless communication), a set of an IEEE 802.11b port and a transmission/reception circuit (wireless communication), and a set of a local area network (LAN) terminal and a transmission/reception circuit (wired communication).

The IC chip 166 carries out a variety of functions in an integration circuit, the functions being related to communication with a communication path formed by near field communication (NFC), and functions as a later-described second communication unit 122, for example. Here, the IC chip 166 is connected to the communication antenna 168 including a resonance circuit formed of a coil having a predetermined inductance as a transmission/reception antenna and a capacitor having a predetermined electrostatic capacity, and performs communication with the communication path formed by NFC via the communication antenna 168, for example. Examples of circuits in which the IC chip 166 is integrated include a demodulation circuit, a regulator, a load modulation circuit which is formed of a load resistance and a switching circuit and selectively performs load modulation, a processing circuit which controls various data processing or load modulation, and a memory element capable of storing data. Further, the IC chip 166 may also include a carrier detecting circuit which generates rectangular wave detection signals for detecting reception of carrier waves.

The GPS receiving circuit 170 is a means for acquiring a log which is included in the communication terminal 10 and which indicates the movement of the communication terminal 10 (log corresponding to the user's movement), and detects the position of the communication terminal 10 by use of signals received from a GPS satellite, for example.

Note that the hardware configuration of the communication terminal 10 is not limited to the above configuration. For example, the communication terminal 10 may also include an imaging device for capturing outside images.

Further, the communication terminal 10 does not necessarily include the GPS receiving circuit 170.

Note that the same hardware configuration as the communication terminal 10 may be used for the relaying device 20 and the information processing device 30 which will be described later.

(Communication Network 12)

The communication network 12a is a wired/wireless transmission path of information transmitted from a device connected to the communication network 12a. For example, the communication network 12a may include public line networks, such as the Internet, a telephone network, and a satellite communication network, a variety of LANs, such as Ethernet (registered trademark), and a wide area network (WAN). Further, the communication network 12a may include a leased line network, such as an internet protocol-virtual private network (IP-VPN).

Furthermore, the communication network 12b is a network which connects the relaying device 20 and the information processing device 30. For example, the communication network 12b may be formed as a part of a POS system or a part of a ticket selling system at a theater or the like. Note that the communication networks 12a and 12b may be physically connected to a communication line.

(Relaying Device 20)

The relaying device 20 is a device installed in a store where a POS system is established, for example. The relaying device 20 has a communication function, such as a near field communication function, a wireless communication function, or a wired communication function. Further, the relaying device 20 includes an arithmetic and control means, such as a CPU or an MPU, and a storage means, such as a magnetic disk or a semiconductor memory. Note that the relaying device 20 may be installed in a plurality of stores where POS systems are established or a plurality of the relaying devices 20 may be installed in one store, for example.

(Information Processing Device 30)

The information processing device 30 is a computer connected to the relaying device 20 via the communication network 12b. The information processing device 30 may be a device for managing POS systems established in a plurality of stores, for example. Further, the information processing device 30 includes an arithmetic and control means, such as a CPU or an MPU, a storage means, such as a magnetic disk or a semiconductor memory, and a communication means.

(Settlement Managing Server 40)

The settlement managing server 40 is a computer connected to the information processing device 30. The settlement managing server 40 may be a device for managing settlement information of each customer at each store where the relaying device 20 is installed. Further, the settlement managing server 40 includes an arithmetic and control means, such as a CPU or an MPU, a storage means, such as a magnetic disk or a semiconductor memory, and a communication means. Note that although FIG. 1 shows an example in which the information processing device 30 and the settlement managing server 40 are different devices, the present disclosure is not limited to this example. For example, in a case where the information processing device 30 includes a function of the settlement managing server 40, the settlement managing server 40 is not necessarily installed.

2. Summary of the Present Disclosure

The basic configuration of the communication system according to each embodiment of the present disclosure is described above. A summary of each embodiment of the present disclosure, including the above-described communication system, is as follows.

Here, an example will be described with reference to FIG. 3 in which each embodiment of the present disclosure is applied to a situation where a customer carrying the communication terminal 10 with him/her comes to a store where the relaying device 20 is installed and purchases a product at the store.

Figure 3:
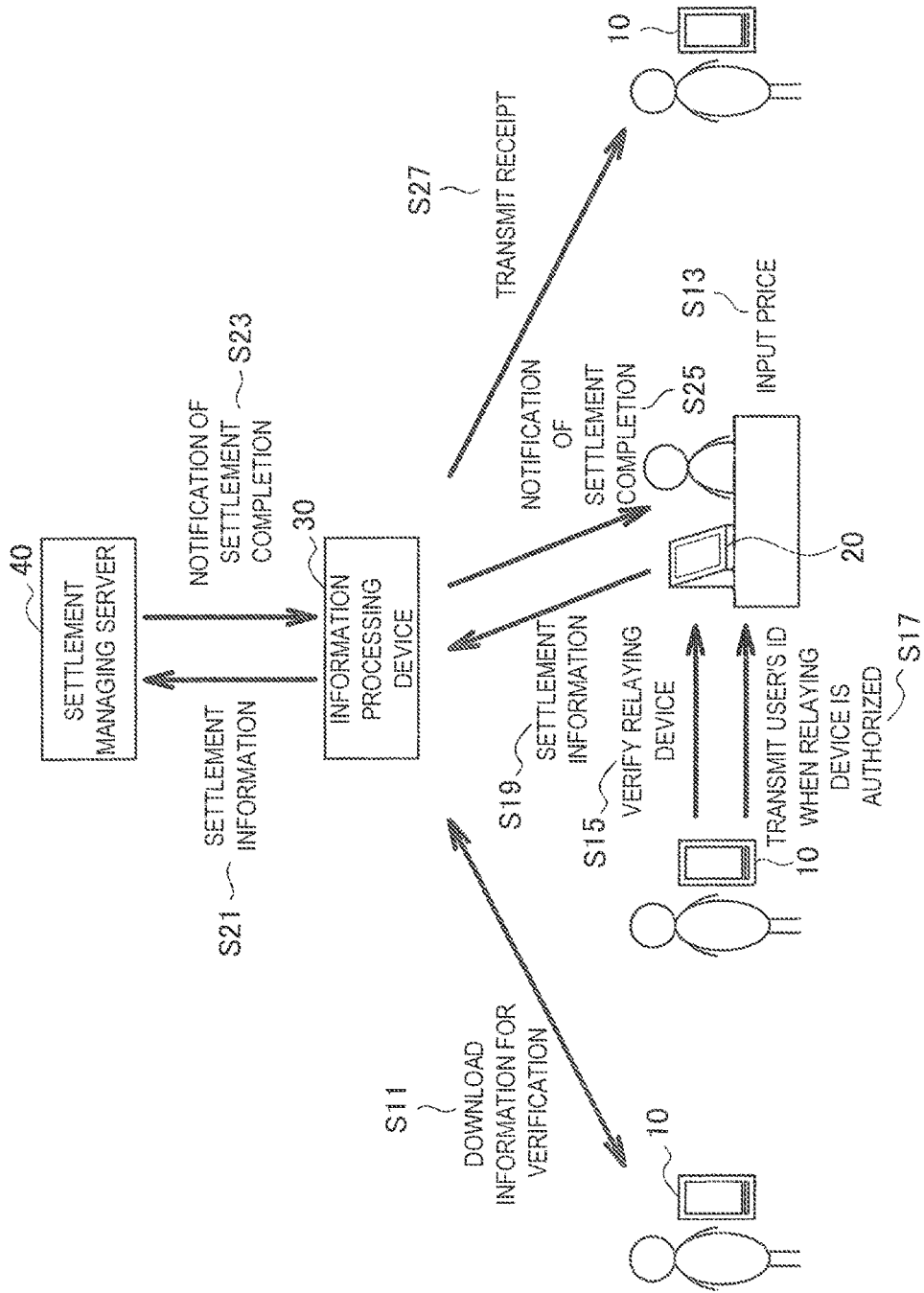
FIG. 3 is a view for describing a schematic operation of each embodiment of the present disclosure.

As shown in FIG. 3, first, the customer allows the communication terminal 10 to communicate with the information processing device 30 prior to the purchase of the product and to acquire first information and second information associated with the first information from the information processing device 30 (S11). One of examples of the first and second information is information for verifying the relaying device 20.

Next, the customer selects the product to purchase at the store, and presents the product to a working staff at the store. Then, the staff at the store inputs the price of the product selected by the customer to a POS system (S13), for example. Next, the staff at the store asks the customer to put the communication terminal 10 over the relaying device 20 in order to perform settlement, for example.

When the customer puts the communication terminal 10 over the relaying device 20, the communication terminal 10 allows transmission of, to the relaying device 20, authentication information for authenticating the relaying device 20, which is a verification target device, based on the first information acquired from the information processing device 30, by near field communication, for example. Further, the communication terminal 10 verifies the validity of the relaying device 20 based on a response to the authentication information received from the relaying device 20 and the second information (S15), for example.

Next, when it is determined that the relaying device 20 is an authorized device, the communication terminal 10 transmits information necessary for settlement, such as a user's ID, to the relaying device 20 (S17).

Then, the relaying device 20 transmits, to the information processing device 30, the information received from the communication terminal 10 and settlement information containing the price of the product input to the POS system (S19). After that, the information processing device 30 transmits the settlement information received from the relaying device 20 to the settlement managing server 40 (S21).

Next, the settlement managing server 40 collates customer's information registered in the settlement managing server 40 with the settlement information received from the information processing device 30, and determines whether the settlement can be performed by the customer. When it is determined that the settlement is possible, the settlement managing server 40 executes settlement processing, and transmits a notification of settlement completion to the information processing device 30 (S23).

Then, the information processing device 30 transmits the notification of settlement completion to the POS system of the store (S25). Further, the information processing device 30 transmits a receipt containing contents of the settlement to the communication terminal 10 via email (S27) for example.

As described above, the communication terminal 10 allows transmission of, to the relaying device 20, the authentication information for verifying the relaying device 20, which is the verification target device, based on the first information acquired from the information processing device 30. Further, the communication terminal 10 verifies the validity of the relaying device 20 based on the response to the authentication information and the second information acquired from the information processing device 30, the second information being associated with the first information. Accordingly, since the communication terminal 10 can verify the relaying device 20 based on the first and second information acquired from the information processing device 30, it is possible to determine whether the relaying device 20 is an unauthorized device.

3. Detailed Description of Each Embodiment

Each embodiment of the present disclosure will be described sequentially in detail.

3-1. First Embodiment (3-1-1. Configuration According to the First Embodiment)
(3-1-1-1. Communication Terminal 10)

Figure 4:
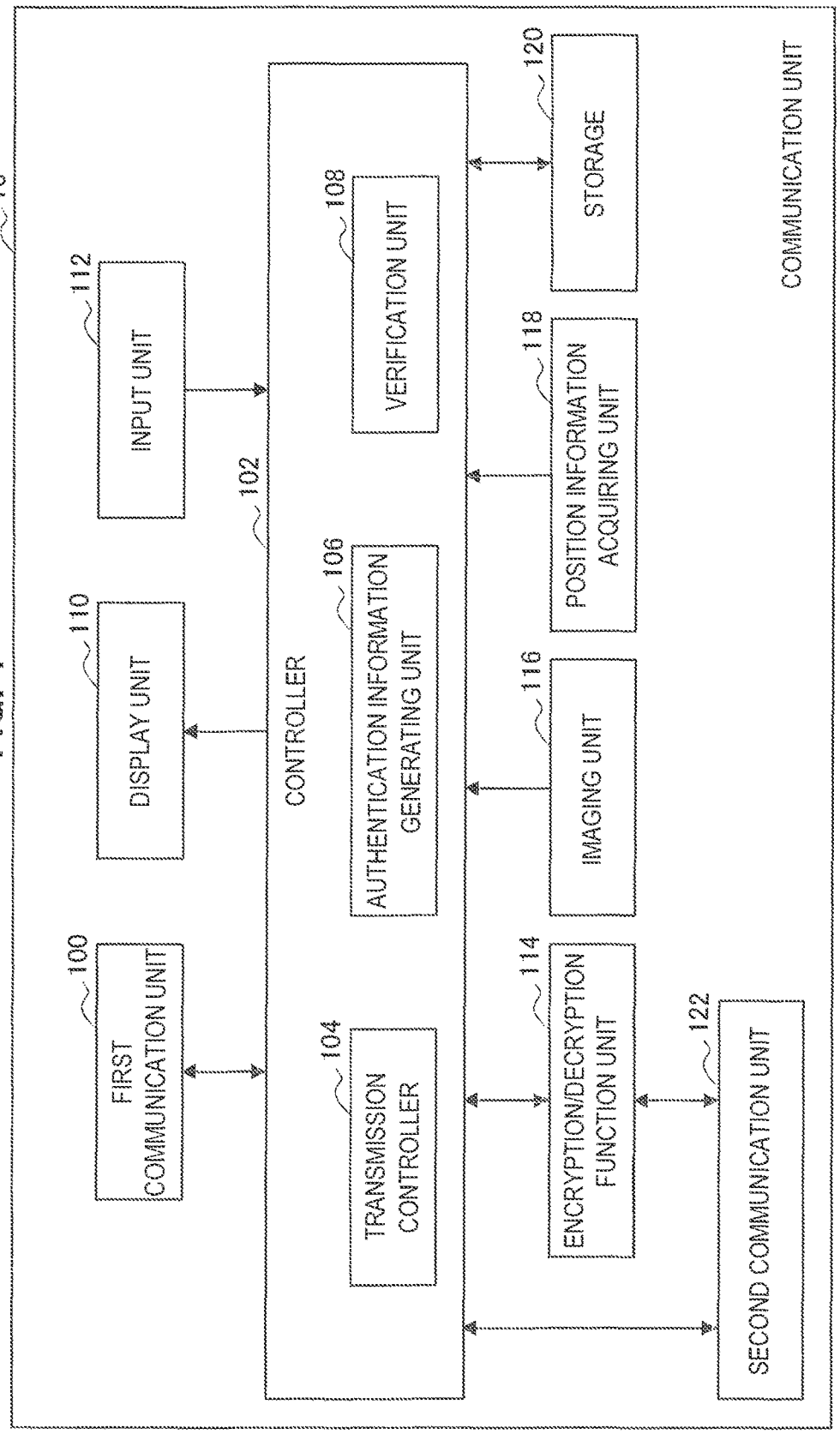
FIG. 4 is a functional block diagram showing a configuration of a communication terminal according to a first embodiment of the present disclosure.

FIG. 4 is a functional block diagram showing a configuration of the communication terminal 10 according to the first embodiment of the present disclosure. As shown in FIG. 4, the communication terminal 10 according to the first embodiment of the present disclosure includes the first communication unit 100, a controller 102, the display unit 110, the input unit 112, the encryption/decryption function unit 114, an imaging unit 116, a position information acquiring unit 118, the storage 120, and a second communication unit 122. Further, the controller 102 includes the transmission controller 104, the authentication information generating unit 106, and the verification unit 108.

The first communication unit 100 transmits and receives various pieces of information to and from an external device, such as the information processing device 30, via the communication network 12a. For example, the first communication unit 100 receives the first information and the second information associated with the first information from the information processing device 30.

Here, the first and second information may be, for example, information used to generate the authentication information for authenticating the relaying device 20 by the later-described authentication information generating unit 106. Further, the first information contains one or more random numbers and the second information may be information associated with the random number(s), such as results of arithmetic calculation of the random number(s) in accordance with a specific algorithm (hereinafter referred to as result of random number(s)).

The controller 102 has a function of controlling the entire operations of the communication terminal 10. For example, the controller 102 controls operations of the first communication unit 100, the display unit 110, the encryption/decryption function unit 114, the imaging unit 116, the position information acquiring unit 118, the storage 120, and the second communication unit 122.

The transmission controller 104 controls transmission of various pieces of information. For example, the transmission controller 104 allows the second communication unit 122 to transmit the authentication information generated by the later-described authentication information generating unit 106 to the relaying device 20. Further, when the later-described verification unit 108 verifies that the relaying device 20 is authorized, the transmission controller 104 may allow the information processing device 30 to transmit information for executing predetermined processing to the relaying device 20.

Here, examples of the predetermined processing include settlement processing by a POS system, processing for selling tickets at a theater, and processing for issuing some kind of coupons. Further, examples of the information for executing predetermined processing includes a user's ID, a password, a credit card number, and a terminal identification number of the communication terminal 10, which are used for settlement.

Furthermore, when the verification unit 108 verifies that the relaying device 20 is unauthorized, the transmission controller 104 does not necessarily allow transmission of the information for executing predetermined processing to the relaying device 20.

Further, when the verification unit 108 verifies that the relaying device 20 is unauthorized, the transmission controller 104 may allow transmission of reporting information for reporting verification results of the relaying device 20 to an external device. Here, examples of the reporting information include position information of the communication terminal 10 acquired by the later-described position information acquiring unit 118, a life log produced by the user of the communication terminal, and an image captured by the later-described imaging unit 116. Further, the reporting information may contain one more of the position information of the communication terminal 10, the life log, and the image captured by the communication terminal 10. Note that functions of the transmission controller 104 will be described later in detail.

The authentication information generating unit 106 generates authentication information for authenticating the relaying device 20 based on the first information, such as the random number(s). For example, when the first information is one or more random numbers, the authentication information generating unit 106 may extract any one of random numbers from the first information, and may define the extracted random number as the authentication information.

The verification unit 108 verifies the validity of the verification target device, such as the relaying device 20, based on the response to the authentication information and the second information acquired from the information processing device 30. For example, the verification unit 108 may determine whether the response to the authentication information received from the verification target device is authorized based on the second information, and may determine the validity of the verification target device based on determination results.

Here, the "authorized verification target device" refers to a verification target device which does not execute unauthorized processing. For example, in that case, communication information of the communication terminal 10 is not used in an unauthorized manner nor leaked by the verification target device.

The display unit 110 displays a variety of display screens, such as an operation screen for used by a user to operate the communication terminal 10. For example, when the verification unit 108 verifies that the relaying device 20 is unauthorized, the display unit 110 may display verification results of the relaying device 20.

The input unit 112 receives a variety of operations performed by the user of the communication terminal 10. For example, as described later, the input unit 112 may receive an operation performed by the user to launch an application for settlement via the relaying device 20 or an operation to allow the imaging unit 116 to execute imaging processing.

The encryption/decryption function unit 114 executes processing for encrypting information to be transmitted via the later-described second communication unit 122, or for decrypting the encrypted information received via the second communication unit 122. For example, the encryption/decryption function unit 114 encrypts the information for executing predetermined processing. Further, the encryption/decryption function unit 114 decrypts the encrypted information received from the relaying device 20 based on the second information, for example.

The imaging unit 116 has functions of allowing an image sensor, such as a charge coupled device (CCD) imaging plate, to form an image of an outside image through a lens of the communication terminal 10, and of capturing still images or moving images.

The position information acquiring unit 118 acquires position information indicating a current position of the communication terminal 10 by receiving GPS signals, for example.

The storage 120 is formed of a memory device, such as a semiconductor memory or a magnetic disk. The storage 120 stores various data, such as the information for executing predetermined processing. Further, the storage 120 stores various software programs, such as an application for settlement via the relaying device 20.

The second communication unit 122 transmits and receives various pieces of information to and from the relaying device 20, for example, by near field communication. For example, the second communication unit 122 receives an encrypted session key from the relaying device 20 by near field communication.

Note that according to the first embodiment, it is also possible to provide a computer program for causing hardware, such as the CPU 150, the ROM 152, and the RAM 154 incorporated in the communication terminal 10, to function in a manner similar to that of the respective components of the communication terminal 10. Further, it is possible to provide a storage medium in which the computer program is stored.

The configuration of the communication terminal 10 according to the first embodiment is described above. However, configurations of the present disclosure are not limited to the above configuration as long as the configurations each have a function to solve one or more problems for the present disclosure. For example, the encryption/decryption function unit 114 may be incorporated in the controller 102. Further, the communication terminal 10 does not necessarily include the imaging unit 116 or the position information acquiring unit 118. Furthermore, any one or more of the first communication unit 100, the authentication information generating unit 106, the display unit 110, the input unit 112, the encryption/decryption function unit 114, the imaging unit 116, the position information acquiring unit 118, the storage 120, and the second communication unit 122 may be provided in an external device of the communication terminal 10.

(3-1-1-2. Relaying Device 20)

Figure 5:
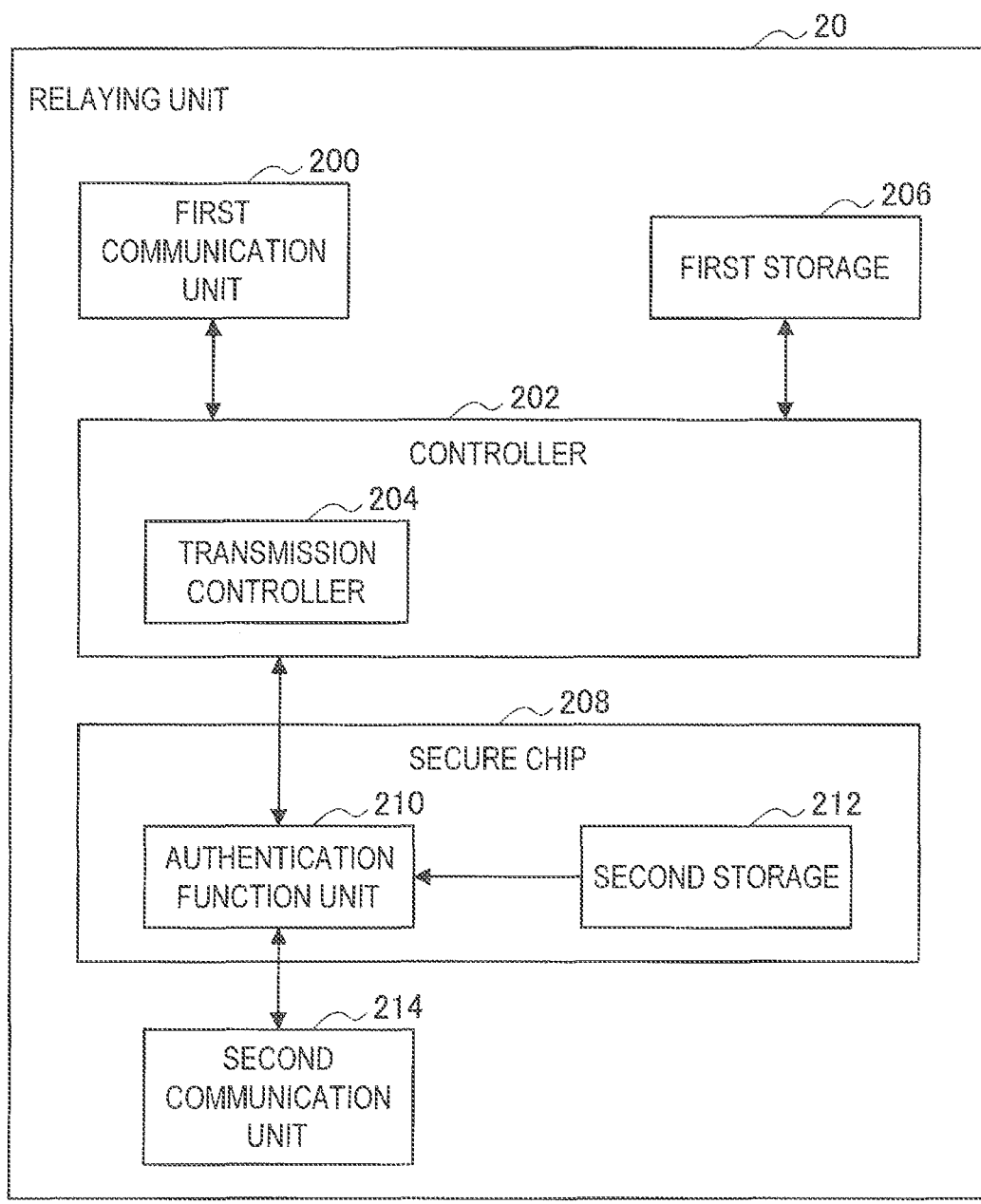
FIG. 5 is a functional block diagram showing a configuration of a relaying device according to the same embodiment.

FIG. 5 is a functional block diagram showing a configuration of the relaying device 20 according to the first embodiment of the present disclosure. As shown in FIG. 5, the relaying device 20 according to the first embodiment includes a first communication unit 200, a controller 202, a first storage 206, a secure chip 208, and a second communication unit 214. Further, the controller 202 includes a transmission controller 204. Furthermore, the secure chip 208 includes an authentication function unit 210 and a second storage 212.

The first communication unit 200 transmits and receives various pieces of information to and from the information processing device 30 via the communication network 12b.

For example, the first communication unit 200 receives a later-described first session key from the information processing device 30.

The controller 202 has a function of controlling the entire operations of the relaying device 20. For example, the controller 202 controls operations of the first communication unit 200, the first storage 206, and the authentication function unit 210. Further, when the relaying device 20 incorporates a POS system, the controller 202 can communicate with a POS unit (not shown) executing processing in the POS system; alternatively, the controller 202 itself may have a function of the POS unit.

The transmission controller 204 controls transmission of various pieces of information to the first communication unit 200. For example, the transmission controller 204 allows the first communication unit 200 to transmit the information for executing predetermined processing to the information processing device 30.

The first storage 206 is formed of a storage device, such as a semiconductor memory or a magnetic disk. The first storage 206 stores various pieces of information, such as communication control information, or various software programs, such as a software program, for controlling the operation of the relaying device 20.

The secure chip 208 is formed of a tamper-resistant IC chip or the like. The secure chip 208 is designed such that no other units besides the later-described authentication function unit 210 can acquire information stored in the later-described second storage 212. Accordingly, even when the relaying device 20 is hacked by an external device, the information stored in the second storage 212 can be prevented from being tampered by the external device.

The authentication function unit 210 has a function of generating a session key used for communication via the communication network 12. For example, the authentication function unit 210 generates a second session key, which is a session key used for communication with the communication terminal 10. Further, the authentication function unit 210 may generate the second session key associated with the first and second information. Note that contents of the first session key will be described later.

Further, the authentication function unit 210 has a function of encrypting information to be transmitted by the later-described second communication unit 214. For example, the authentication function unit 210 encrypts the second session key generated by the authentication function unit 210.

Furthermore, the authentication function unit 210 has a function of decrypting the encrypted information received via the later-described second communication unit 214. For example, the authentication function unit 210 decrypts the information for executing predetermined processing which is encrypted and received from the communication terminal 10.

Furthermore, the authentication function unit 210 has a function of acquiring the information stored in the later-described second storage 212.

The second storage 212 is formed of a storage device provided in the inside of the secure chip 208. The second storage 212 stores various pieces of information which has high confidentiality and which needs to be prevented from tampering, such as a store ID of a store where the relaying device 20 is installed or information used by the authentication function unit 210 as a base to generate the session key.

The second communication unit 214 transmits and receives various pieces of information to and from the communication terminal 10, for example, by near field communication. For example, the second communication unit 214 transmits an encrypted session key to the communication terminal 10 by near field communication.

(3-1-1-3. Information Processing Device 30)

Figure 6:
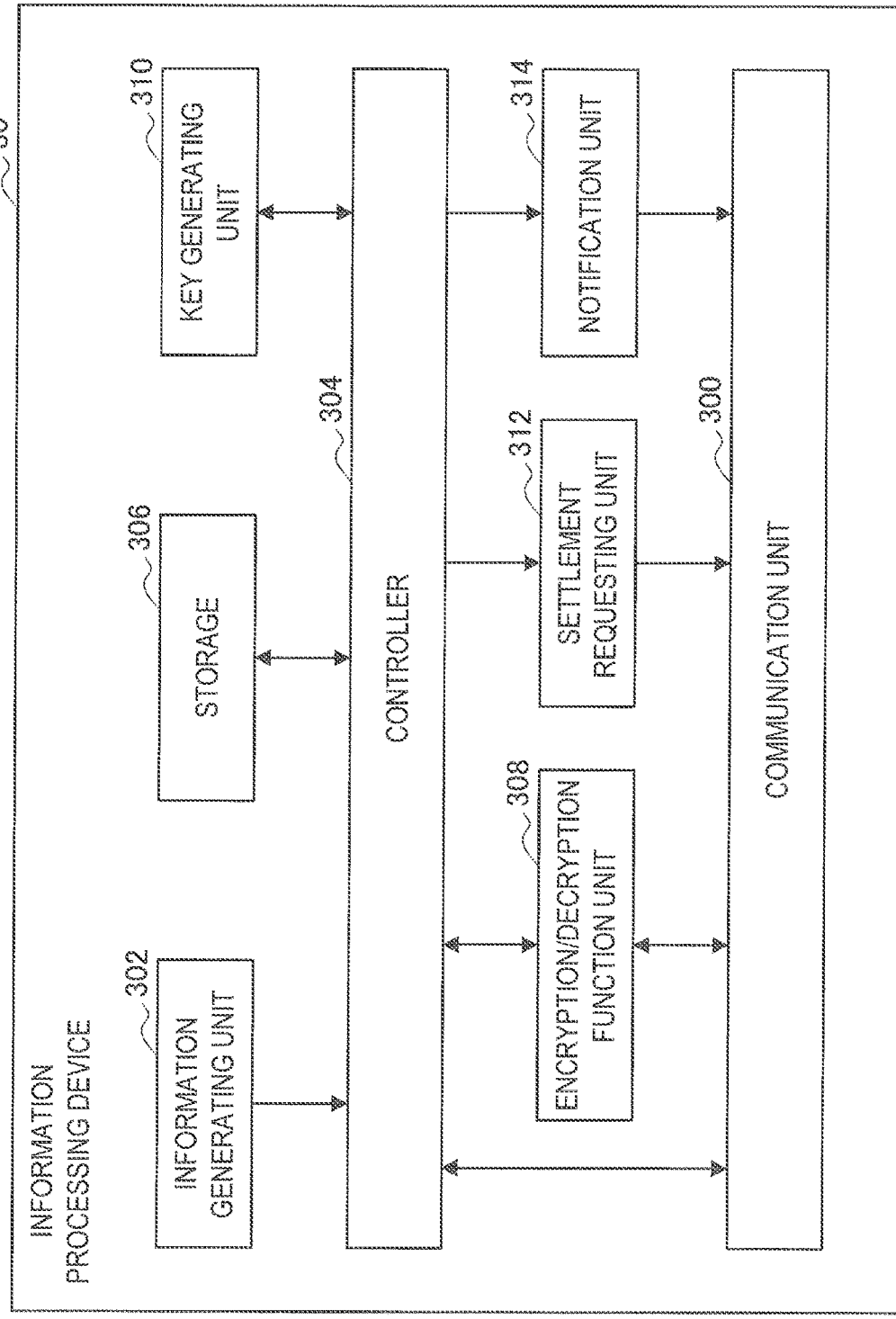
FIG. 6 is a functional block diagram showing a configuration of an information processing device according to the same embodiment.

FIG. 6 is a functional block diagram showing a configuration of the information processing device 30 according to the first embodiment of the present disclosure. As shown in FIG. 6, the information processing device 30 according to the first embodiment includes a communication unit 300, an information generating unit 302, a controller 304, a storage 306, an encryption/decryption function unit 308, a key generating unit 310, a settlement requesting unit 312, and a notification unit 314.

The communication unit 300 transmits and receives various pieces of information between the communication terminal 10 and the relaying device 20 via the communication network 12. For example, the communication unit 300 transmits the first and second information to the communication terminal 10 and receives the (encrypted) information for executing predetermined processing from the relaying device 20.

The information generating unit 302 generates random number(s) as the first information by use of a specific algorithm, for example. Note that the information generating unit 302 may generate the random number(s) different from all the numbers stored in the later-described storage unit 306. Further, the information generating unit 302 generates information associated with the random number(s) as the second information, such as a result of the generated random number(s).

The controller 304 has a function of controlling the entire operations of the information processing device 30. For example, the controller 304 controls operations of the communication unit 300, the information generating unit 302, the storage 306, the encryption/decryption function unit 308, the key generating unit 310, the settlement requesting unit 312, and the notification unit 314.

Further, the controller 304 has a function of controlling transmission of various pieces of information to the communication unit 300. For example, the controller 304 allows the communication unit 300 to transmit the first and second information generated by the information generating unit 302 to the communication terminal 10.

The storage 306 is formed of a storage device, such as a semiconductor memory or a magnetic disk. The storage 306 stores various data, such as the random number(s) generated by the information generating unit 302.

The encryption/decryption function unit 308 executes processing for encrypting information to be transmitted via the communication unit 300 and for decrypting the encrypted information received via the communication unit 300. For example, the encryption/decryption function unit 308 encrypts the first session key generated by the later-described key generating unit 310. Further, the encryption/decryption function unit 308 decrypts the encrypted information for executing predetermined processing received from the relaying device 20.

The key generating unit 310 generates the first session key, which is a session key used for communication with the relaying device 20. Note that according to the first embodiment, the first session key is a session key different from the above second session key.

The settlement requesting unit 312 requests the settlement managing server 40 of settlement processing based on the information for executing predetermined processing, which is decrypted by the encryption/decryption function unit 308. Note that when a function of the settlement managing server 40 is incorporated in the information processing device 30 and the communication system does not include the settlement managing server 40, for example, the settlement requesting unit 312 may execute the settlement processing based on the information for executing predetermined processing.

The notification unit 314 transmits, to the relaying device 20, a notification of completion of the settlement processing when information of completion of the settlement processing is received from the settlement managing server 40 via the communication unit 300. Further, the notification unit 314 transmits a receipt containing contents of the settlement to the communication terminal 10 via the communication unit 300 via email, for example.

(3-1-2. Operations According to the First Embodiment)

(3-1-2-1. Operation Before Settlement)

The configuration according to the first embodiment is described above. Operations according to the first embodiment are as follows. First, operations before settlement according to the first embodiment will be described. FIG. 7 is a sequence diagram showing the operations before settlement according to the first embodiment. Note that in the operations before settlement, communication is assumed to be performed by making communication contents between the communication terminal 10 and the information processing device 30 confidential.

As shown in FIG. 7, first, with an operation performed by the user of the communication terminal 10 to the input unit 112, the transmission controller 104 of the communication terminal 10 allows the first communication unit 100 to transmit information necessary for settlement, such as the user's ID, the password, or the credit card information, to the information processing device 30 (S101).

Next, the storage 306 of the information processing device 30 stores information received from the communication terminal 10, such as the user's ID, the password, or the credit card information in association with each other.

Then, the information generating unit 302 generates a set of random number keys containing at least one random number as the first information. Further, the information generating unit 302 generates information associated with the set of random number keys, such as a result of arithmetic calculation of each random number contained in the set of random number keys in accordance with a specific algorithm (hereinafter referred to as result of the set of random number keys), as the second information.

Here, the information generating unit 302 may set limitations on the number and/or period of usage of the set of random number keys and the result of the set of random number keys, such as the upper limit of the number of usage by the user or a usage period. Further, the controller 304 may allow the storage 306 to store the set of random number keys and the result of the set of random number keys, which are generated by the information generating unit 302, and which are associated with the user's ID received from the communication terminal 10.

Furthermore, the information generating unit 302 may generate the set of random number keys by changing the number of random numbers contained in the set of random number keys based on the user's ID received from the communication terminal 10 or a service offered by the information processing device 30, or the like. For example, the information generating unit 302 may generate the set of random number keys such that the number of random numbers is larger than normal for a service with which off-line settlement is often performed, such as gift certificates at underground shopping malls.

Further, since a user having a large number of use results is unlikely to perform unauthorized usage, the information generating unit 302 may generate the set of random number keys such that the number of random numbers for the user is smaller than normal. By use of this modification example, since the number of requests for acquiring the set of random number keys from the user having a large number of use results decreases, the number of access from the communication terminal 10 to the information processing device 30 is decreased. Accordingly, there are advantages in that the load on the information processing device 30 can be reduced and that users can use the communication terminal 10 more conveniently.

Next, the communication unit 300 transmits the set of random number keys and the result of the set of random number keys which are generated by the information generating unit 302 to the communication terminal 10.

Then, the communication terminal 10 records the received set of random number keys and results of the set of random number keys on a recording medium incorporated in the communication terminal 10 or connected thereto (S103). Here, the recording medium may or may not have a tamper-resistant feature. Note that the recording medium may be contained in the storage device 156 of the communication terminal 10 or may be detachably attached to the communication terminal 10.

(3-1-2-2. Operations at the Time of Settlement)

Operations at the time of settlement according to the first embodiment are as follows. FIG. 8 is a part of a sequence diagram showing operations at the time of settlement according to the first embodiment. Note that FIG. 8 is a sequence diagram when the relaying device 20 is an authorized device, and here, it is assumed that the relaying device 20 is an authorized device.

As shown in FIG. 8, first, when the staff at the store performs an operation, such as input of the price of a product purchased by the user of the communication terminal 10 to a POS system, for example, the relaying device 20 starts preparing for settlement (S111).

Further, the key generating unit 310 of the information processing device 30 generates the first session key, which is a session key used for communication between the information processing device 30 and the relaying device 20 (S113). Then, the encryption/decryption function unit 308 encrypts the first session key generated by the key generation unit 310. Further, the controller 304 allows the communication unit 300 to transmit the encrypted first session key to the relaying device 20.

Next, the authentication function unit 210 of the relaying device 20 decrypts the encrypted first session key received from the information processing device 30. Further, the first storage 206 stores the decrypted first session key (S115).

Next, with an operation by the user of the communication terminal 10 with respect to the input unit 112, the controller 102 of the communication terminal 10 launches an application for settlement stored in the storage 120 (S117).

Then, the authentication information generating unit 106 of the communication terminal 10 extracts one of random numbers from the set of random number keys recorded on the recording medium, and sets the extracted random number (hereinafter referred to as random number 1) as authentication information for authenticating the relaying device 20. Next, the transmission controller 104 allows the first communication unit 100 to transmit the random number 1 to the relaying device 20 (S119).

Next, when the relaying device 20 receives the random number 1 from the communication terminal 10, the first storage 206 stores the received random number 1. Then, the authentication function unit 210 generates the second session key, which is a session key used for communication between the relaying device 20 and the communication terminal 10 (S121).

Next, the authentication function unit 210 of the relaying device 20 obtains a result of the random number 1 corresponding to the random number 1 received from the communication terminal 10, by arithmetic in accordance with a specific algorithm. Next, the authentication function unit 210 encrypts the second session key based on the result of the random number 1. Further, the second communication unit 214 transmits the second session key encrypted by the authentication function unit 210 to the communication terminal 10 as a response to the authentication information (S123). Note that when the relaying device 20 is an unauthorized device, the relaying device 20 does not incorporate the specific algorithm. Therefore, since the authentication function unit 210 fails to obtain the result of the random number 1 by calculation, the second session key fails to be encrypted based on the result of the random number 1.

Next, the verification unit 108 of the communication terminal 10 verifies the validity of the relaying device 20 based on the response to the authentication information received from the relaying device 20 and the result of the random number 1 recorded on the recording medium (S125).

Figure 9:
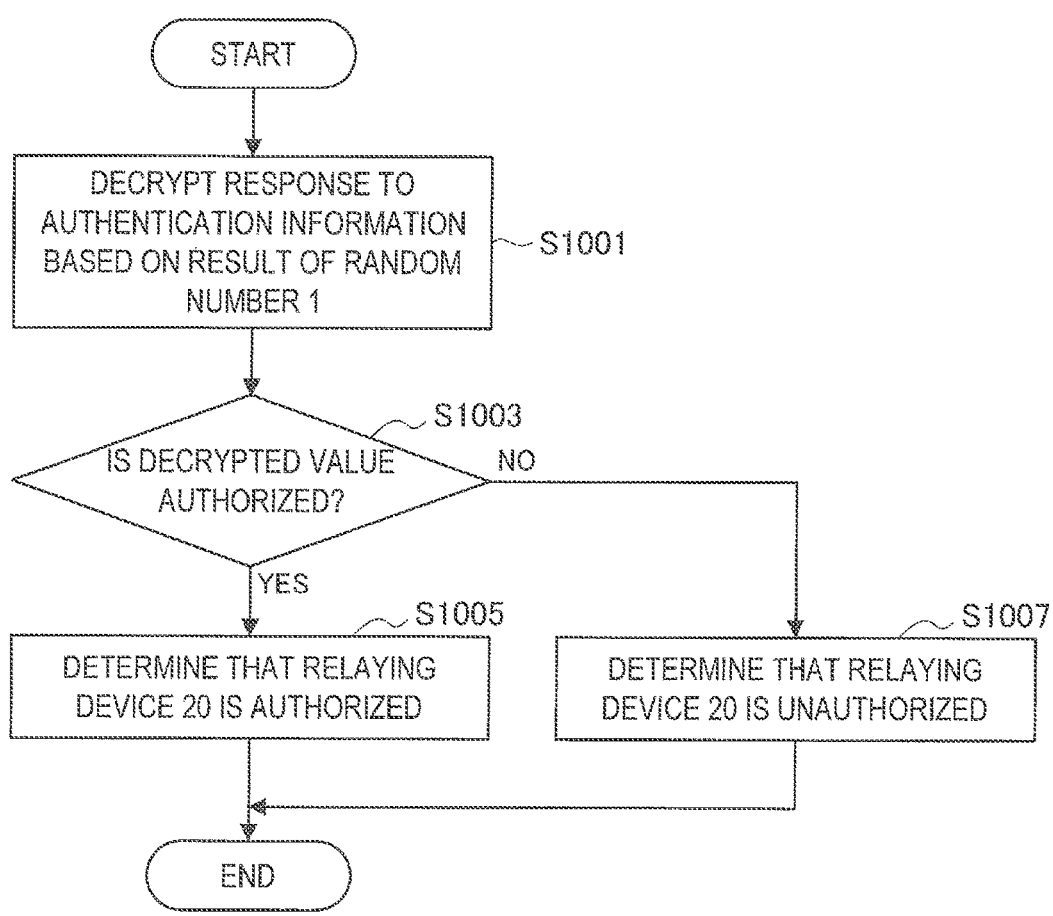
FIG. 9 is a flow chart showing detailed operations in verification processing of a relaying device according to the same embodiment.

Here, operations in S125 will be described in detail with reference to FIG. 9. FIG. 9 is a flow chart showing detailed operations of verification processing of the relaying device 20 in S125.

As shown in FIG. 9, first, the encryption/decryption function unit 114 decrypts the response to the authentication information received from the relaying device 20 based on the result of the random number 1 (S1001). Here, in a case where the relaying device is an authorized device, the communication terminal 10 has received the second session key from the relaying device 20 as the response to the authentication information, the second session key being encrypted based on the result of the random number 1. Accordingly, the encryption/decryption function unit 114 can correctly decrypt the encrypted second session key by the operation in S1001.

Next, the verification unit 108 determines whether a value decrypted by the encryption/decryption function unit 114 is authorized (S1003). For example, when the response to the authentication information contains a hash value with respect to the decrypted data, the verification unit 108 may determine whether the decrypted value is authorized by comparing the hash value with the value decrypted by the encryption/decryption function unit 114.

When it is determined that the value decrypted by the encryption/decryption function unit 114 is authorized (S1003: Yes), the verification unit 108 determines that the relaying device 20 is an authorized device (S1005).

In contrast, when it is determined that the value decrypted by the encryption/decryption function unit 114 is unauthorized (S1003: No), the verification unit 108 determines that the relaying device 20 is an unauthorized device (S1007).

—Operations when it is Verified that the Relaying Device 20 is Authorized

Operations after S125 are as follows. First, operations when the verification unit 108 verifies that the relaying device 20 is authorized in S125 will be described.

Figure 10:
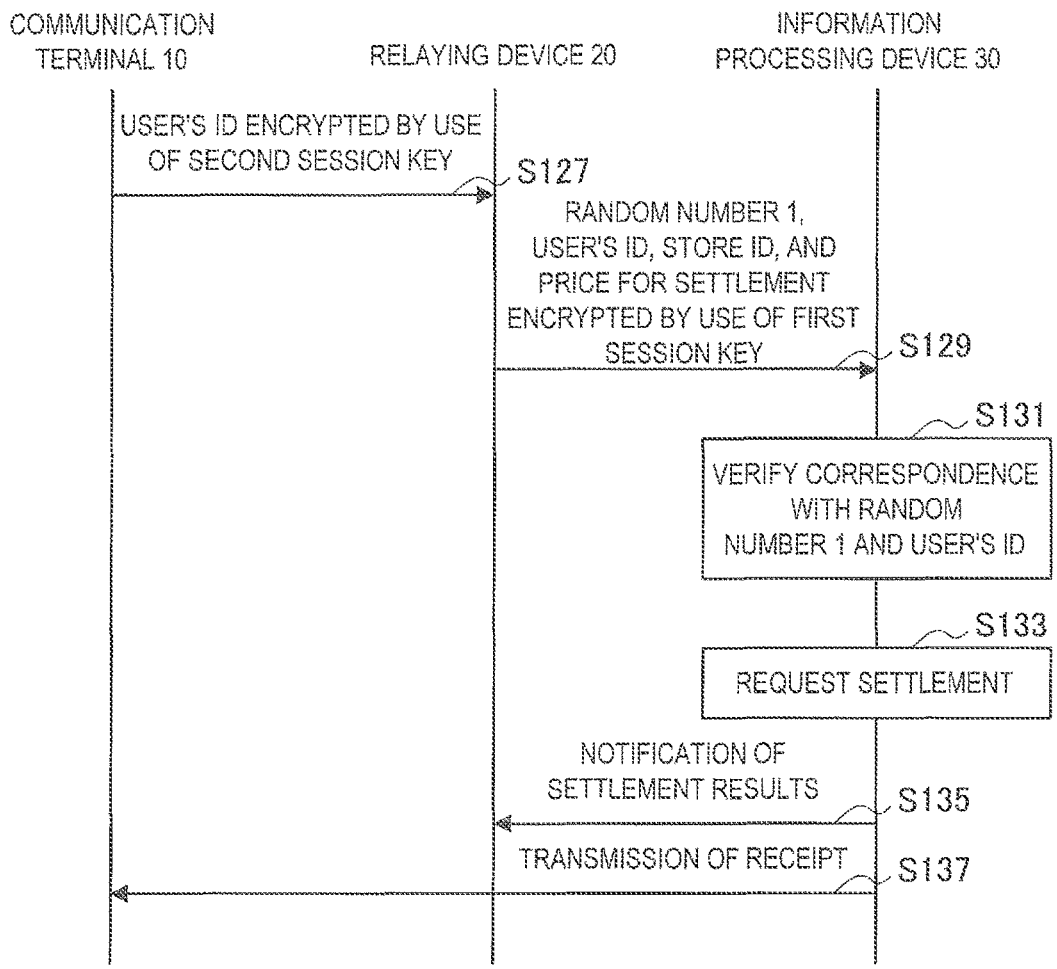
FIG. 10 is a second sequence diagram showing operations at a time of settlement according to the same embodiment.

FIG. 10 is a sequence diagram showing operations when it is verified that the relaying device 20 is authorized in S125. As shown in FIG. 10, first, the controller 102 allows the encryption/decryption function unit 114 to encrypt the information for executing predetermined processing, such as the user's ID, by use of the second session key. Further, the transmission controller 104 allows the second communication unit 122 to transmit the information for executing predetermined processing, which is encrypted by the encryption/decryption function unit 114, to the relaying device 20 by near field communication, for example (S127).

Next, the second communication unit 214 of the relaying device 20 receives the information for executing predetermined processing from the communication terminal 10 by near field communication, for example. Further, the authentication function unit 210 decrypts the information by use of the second session key. Next, the authentication function unit 210 encrypts the decrypted information for executing predetermined processing, the random number 1 stored in the first storage 206, the store ID stored in the second storage 212, the price for settlement of the user of the communication terminal 10, and the like by use of the first session key stored in the first storage 206. Further, the transmission controller 204 allows the first communication unit 200 to transmit the encrypted information to the information processing device 30 (S129).

Next, the encryption/decryption function unit 308 of the information processing device 30 decrypts the information received in S129 by use of the first session key. Then, the controller 304 verifies correspondence with the random number 1 and the user's ID which are decrypted by the encryption/decryption function unit 308 based on correspondence relation of the set of random number keys and the user's ID which are stored in the storage 306 (S131).

Next, when it is determined that there is correspondence with the random number 1 and the user's ID, the settlement requesting unit 312 transmits settlement information containing the user's ID, the store ID, the price for settlement, and the like to the settlement managing server 40 via the communication unit 300, and also requests settlement (S133). Note that when it is determined that there is no correspondence with the random number 1 and the user's ID, the settlement requesting unit 312 does not necessarily transmit the settlement information to the settlement managing server 40 and may allow the communication unit 300 to transmit, to the relaying device 20, a notification saying that there is no correspondence with the random number 1 and the user's ID.

Next, when the information processing device 30 receives the notification of settlement completion from the settlement managing server 40, the notification unit 314 transmits the notification of settlement completion to the relaying device 20 via the communication unit 300 (S135). Further, the notification unit 314 transmits a receipt containing settlement contents to the communication terminal 10 via the communication unit 300 via email, for example (S137).

—Operations when it is Verified that the Relaying Device 20 is Unauthorized

The operations when it is verified that the relaying device 20 is authorized are described above. Operations when it is verified that the relaying device 20 is unauthorized are as follows.

Figure 11:
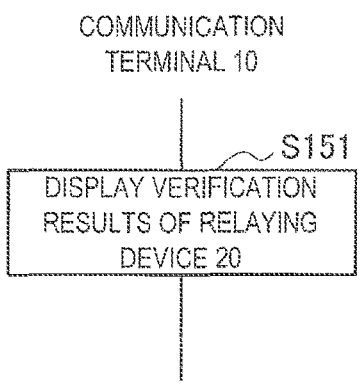
FIG. 11 is a third sequence diagram showing an operation at a time of settlement according to the same embodiment.

FIG. 11 is a sequence diagram showing a first operation example when it is verified that the relaying device 20 is unauthorized in S125. As shown in FIG. 11, the display unit 110 of the communication terminal 10 displays verification results in order to attract attention of the user of the communication terminal 10 (S151).

Figure 12:
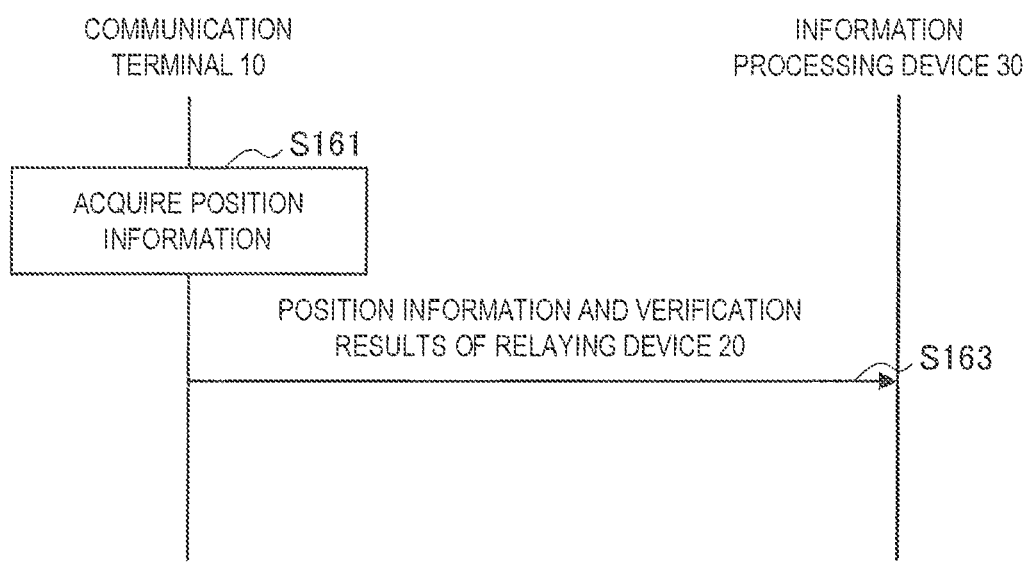
FIG. 12 is a fourth sequence diagram showing operations at a time of settlement according to the same embodiment.

Further, FIG. 12 is a sequence diagram showing a second operation example when it is verified that the relaying device 20 is unauthorized in S125. Note that in the second operation example, the communication terminal 10 can report that the relaying device 20 is an unauthorized device to an external device, such as the information processing device 30.

As shown in FIG. 12, first, the position information acquiring unit 118 of the communication terminal 10 acquires position information of the communication terminal 10 (S161). Note that as a modification example of S161, the imaging unit 116 may image the relaying device 20.

Next, the transmission controller 104 allows the first communication unit 100 to transmit reporting information containing the position information of the communication terminal 10 and the verification results of the relaying device 20 to the information processing device 30 (S163). Note that as a modification example of S163, the transmission controller 104 may allow the first communication unit 100 to transmit, instead of the position information of the communication terminal 10, an image of the relaying device 20 captured by the imaging unit 116 or a life log produced by the user of the communication terminal 10 to the information processing device 30. Further, the transmission controller 104 may allow the first communication unit 100 to transmit any two or more of the position information of the communication terminal 10, the captured image of the relaying device 20, and the life log produced by the user of the communication terminal 10 to the information processing device 30.

(3-1-3. Effects According to the First Embodiment)

As described above, according to the first embodiment, the communication terminal 10 allows the authentication information for authenticating the relaying device 20 based on the random number(s) acquired from the information processing device 30 to be transmitted to the relaying device 20. Further, the communication terminal 10 verifies the validity of the relaying device 20 based on the response to the authentication information received from the relaying device 20 and the result of the random number(s) acquired from the information processing device 30. Accordingly, since the communication terminal 10 can authenticate the relaying device 20 based on the random number(s) acquired from the information processing device 30 and the result of the random number(s), it is possible to determine whether the relaying device 20 is an unauthorized device.

For example, when the relaying device 20 is an unauthorized device, the relaying device 20 does not acquire the set of random number keys and the result of the set of random number keys from the information processing device 30; accordingly, the relaying device 20 is not allowed to respond the authentication information received from the communication terminal 10 in an authorized manner. Accordingly, in this case, the communication terminal 10 can detect that the relaying device 20 is an unauthorized device.

Further, when it is verified that the relaying device 20 is unauthorized, the communication terminal 10 does not transmit the information for executing predetermined processing, such as the user's ID, to the relaying device 20. Accordingly, the communication terminal 10 can prevent communication information, such as the information for executing predetermined processing, from being used in an unauthorized manner or being leaked by the relaying device 20.

Furthermore, when it is verified that the relaying device 20 is unauthorized, the communication terminal 10 transmits reporting information for reporting the verification results of the relaying device 20, such as the position information, to an external device, such as the information processing device 30. Accordingly, the external device, such as the information processing device 30, can detect the unauthorized relaying device 20. Further, the staff at the store can remove the relaying device 20, for example.

Furthermore, the information processing device 30 stores the user's ID, the set of random number keys, and the result of the set of random number keys, in association with each other, before settlement, and checks the correspondence with the user's ID and the random number(s) received from the relaying device 20 at the time of settlement. Accordingly, even when a different user acquires the random number(s) in an unauthorized manner, since the information processing device 30 checks the correspondence with the user's ID and the random number(s) received from the relaying device 20, it is possible to detect unauthorized usage. Further, for the same reason, safety is not decreased even when the set of random number keys and the result of the set of random number keys are recorded on a non-tamper-resistant recoding medium. Accordingly, the communication terminal 10 can carry out the above-described function by use of a non-tamper-resistant inexpensive recoding medium.

When the set of random number keys and the result of the set of random number keys acquired from the information processing device 30 are recorded on a recording medium in advance and the communication terminal 10 communicates with the relaying device 20, the set of random number keys and the result of the set of random number keys recorded on the recording medium are used. Accordingly, even when the communication terminal 10 and the information processing device 30 are off-line, it is possible to execute predetermined processing, such as settlement processing, therebetween. Accordingly, even in facilities where mobile communication does not reach or is unstable, or even when communication failure is generated, it is possible to execute the predetermined processing between the communication terminal 10 and the information processing device 30. For the same reason, even when the communication speed is decreased due to a handover or the like, there is an advantage in that the sense of use of the user of the communication terminal 10 can be prevented from decreasing.

The relaying device 20 includes the authentication function unit 120 in the inside of the secure chip 208 having a tamper-resistant feature. Accordingly, even when a malicious staff rewrites a POS program in an unauthorized manner, the POS program is not allowed to read out or rewrite information stored in the secure chip 208. Therefore, there is an advantage in that significant information, such as the store ID (stored in the secure chip 208), can be prevented from being tampered.

The session key used for communication between the communication terminal 10 and the relaying device 20 is different from the session key used for communication between the relaying device 20 and the information processing device 30. Therefore, there is an advantage in that communication contents between the relaying device 20 and the information processing device 30 are unlikely to be known or tampered by a third party even when the third party hacks the communication terminal 10.

3-2. Second Embodiment

The first embodiment is described above. As described above, according to the first embodiment, the first session key and the second session key are different. However, as described below, according to the second embodiment, the same session key can be used for communication between the relaying device 20 and the communication terminal 10 and communication between the information processing device 30 and the relaying device 20.

(3-2-1. Configuration According to the Second Embodiment)

Figure 13:
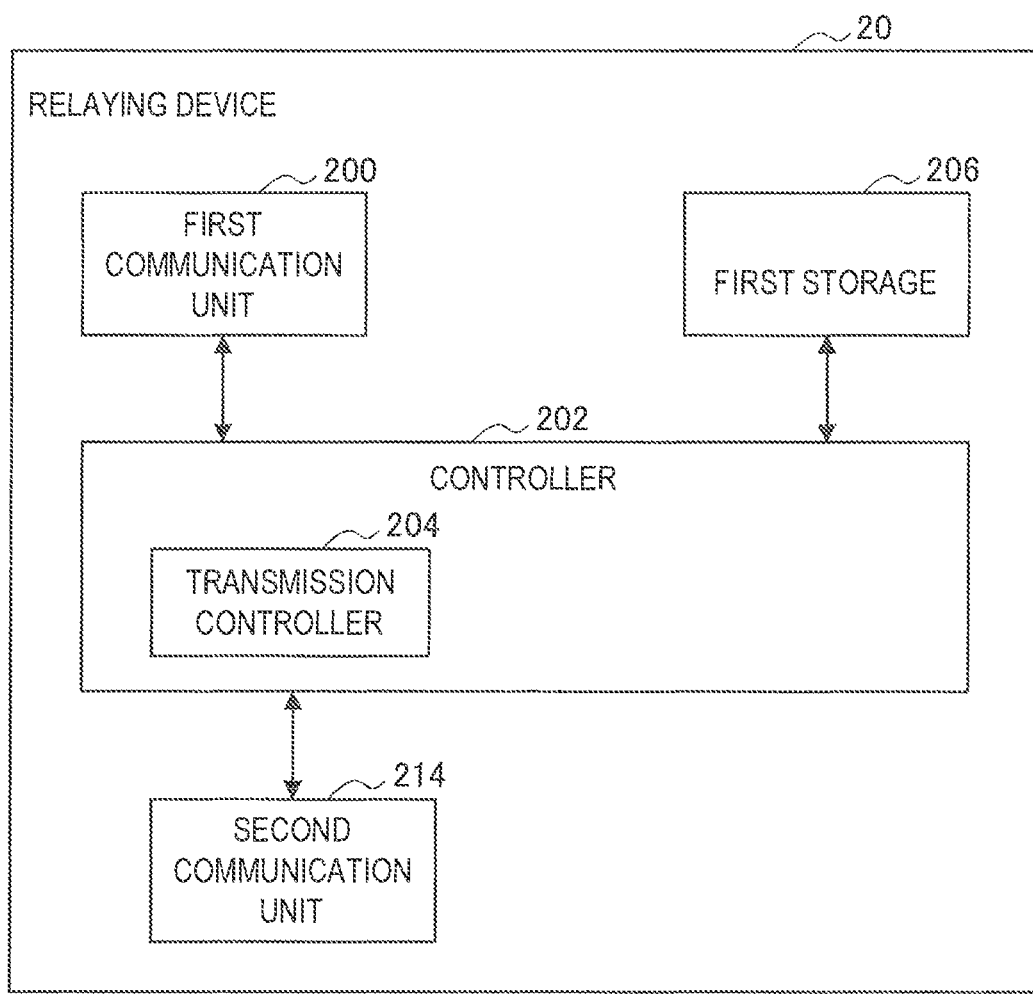
FIG. 13 is a functional block diagram showing a configuration of a relaying device according to a second embodiment of the present disclosure.

FIG. 13 is a functional block diagram showing a configuration of the relaying device 20 according to the second embodiment. As shown in FIG. 3, the relaying device 20 according to the second embodiment does not include the secure chip 208, the authentication function unit 210, and the second storage 212 unlike in the first embodiment. Further, the first storage 206 according to the second embodiment may store various pieces of significant information, such as the store ID of the store where the relaying device 20 is installed.

Note that functions of the other structural elements in the relaying device 20 are the same as those according to the first embodiment.

Further, configurations of the communication terminal 10 and the information processing device 30 according to the second embodiment are the same as those according to the first embodiment; therefore, a description thereof is omitted here.

(3-2-2. Operations According to the Second Embodiment)
(3-2-2-1. Operations Before Settlement)

Operations according to the second embodiment are as follows. Note that operations before settlement according to the second embodiment are generally the same as those according to the first embodiment.

(3-2-2-2. Operations at the Time of Settlement)

Figure 14:
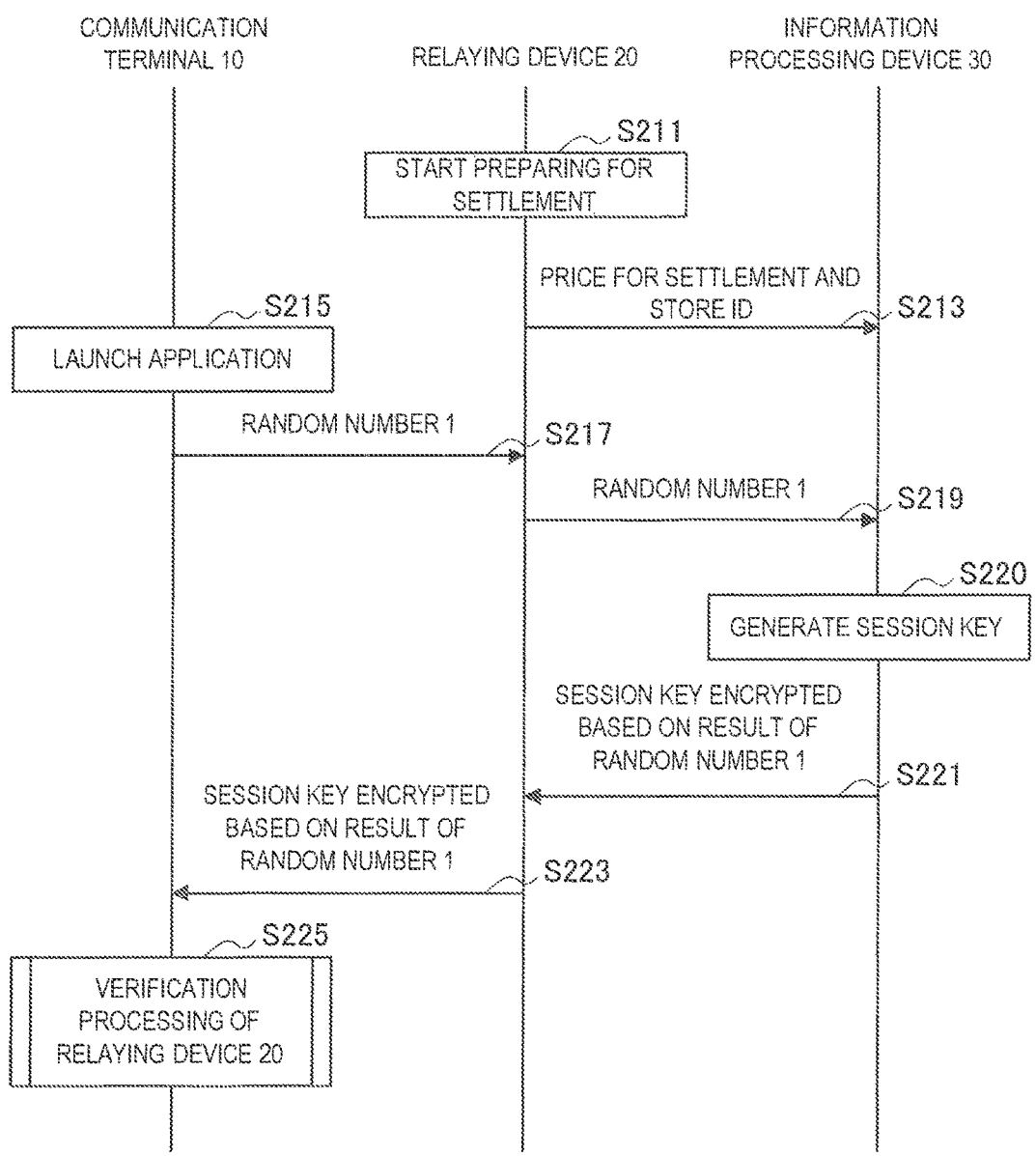
FIG. 14 is a first sequence diagram showing operations at a time of settlement according to the same embodiment.

Operations at the time of settlement according to the second embodiment are as follows. FIG. 14 is a part of a sequence diagram showing operations at the time of settlement according to the second embodiment. Note that FIG. 14 is a sequence diagram when the relaying device 20 is an authorized device. Here, it is assumed that the relaying device 20 is an authorized device.

Note that S211 is the same as S111 according to the first embodiment.

After S211, the transmission controller 204 of the relaying device 20 allows the first communication unit 200 to transmit, to the information processing device 30, information related to settlement, such as the price for settlement of the user of the communication terminal 10 or the store ID stored in the first storage 206 (S213).

Note that an operation in S215 is the same as that in S117 according to the first embodiment. Further, an operation in S217 is the same as that in S119 according to the first embodiment.

After S217, the first storage 206 of the relaying device 20 stores the random number 1 received from the communication terminal 10. Then, the transmission controller 204 allows the first communication unit 200 to transmit the received random number 1 to the information processing device 30 (S219).

Next, the key generating unit 310 of the information processing device 30 generates a session key used for communication between the relaying device 20 and the communication terminal 10 and communication between the information processing device 30 and the relaying device 20 (S220). Here, the key generating unit 310 may generate the session key associated with the set of random number keys and the result of the set of random number keys generated in S103.

Next, the controller 304 acquires the result of the random number 1 corresponding to the random number 1 received from the relaying device 20 from the result of the set of random number keys stored in the storage 306. Then, the controller 304 allows the encryption/decryption function unit 308 to encrypt the session key based on the acquired result of the random number 1. Further, the controller 304 allows the communication unit 300 to transmit the session key encrypted by the encryption/decryption function unit 308 to the relaying device 20 as a response to the authentication information (S221).

Next, the transmission controller 204 of the relaying device 20 allows the second communication unit 214 to transmit the response to the authentication information received from the information processing device 30 to the communication terminal 10 (S223).

Next, the verification unit 108 of the communication terminal 10 verifies the validity of the relaying device 20 based on the response to the authentication information received from the relaying device 20 and the result of the random number 1 recorded on a recording medium, as in S125 (S225).

—Operations when it is Verified that the Relaying Device 20 is Authorized

Operations after S225 are as follows. First, operations when the verification unit 108 verifies that the relaying device 20 is authorized in S225 will be described.

Figure 15:
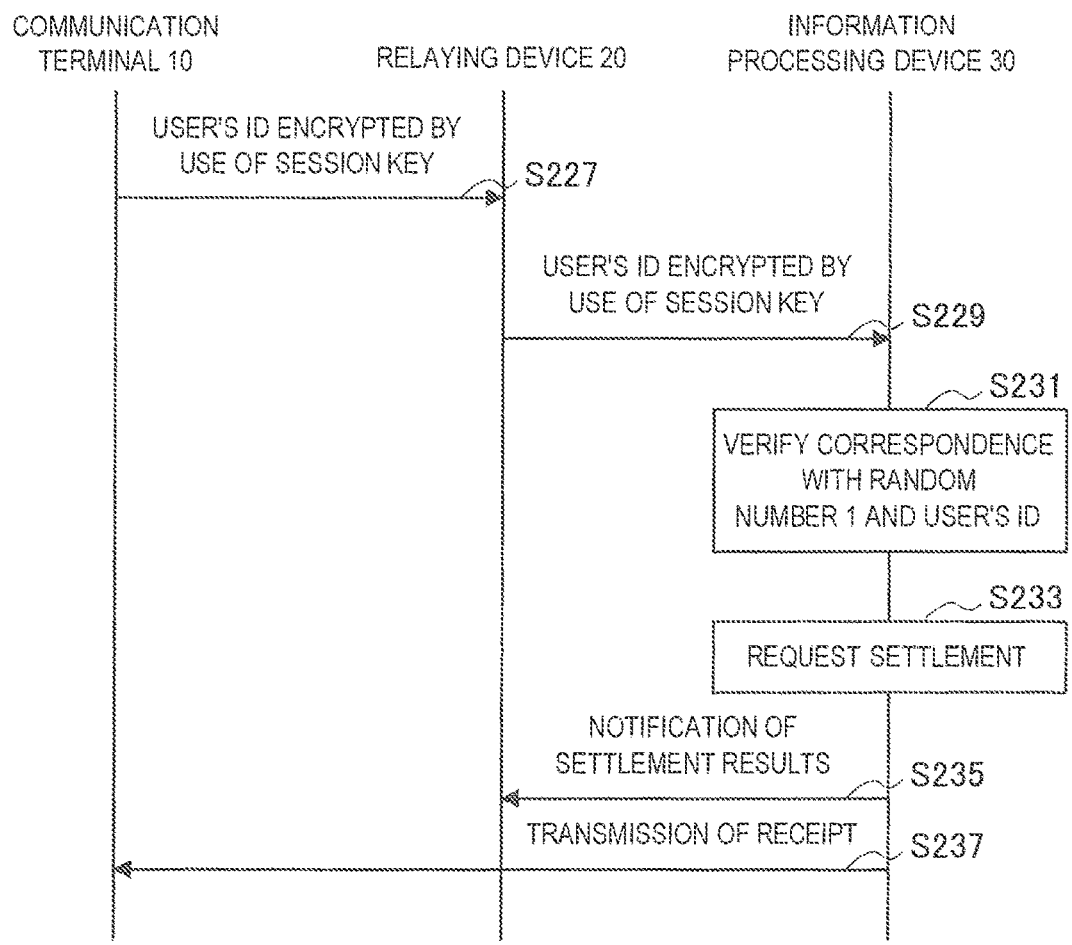
FIG. 15 is a second sequence diagram showing operations at a time of settlement according to the same embodiment.

FIG. 15 is a sequence diagram showing operations when it is verified that the relaying device 20 is authorized in S225. As shown in FIG. 15, first, the controller 102 allows the encryption/decryption function unit 114 to decrypt the encrypted session key received from the relaying device 20. Next, the controller 102 allows the encryption/decryption function unit 114 to encrypt the information for executing predetermined processing, such as the user's ID, by use of the decrypted session key. Further, the transmission controller 104 allows the second communication unit 122 to transmit the encrypted information for executing predetermined processing to the relaying device 20 by near field communication, for example (S227).

Next, the transmission controller 204 of the relaying device 20 allows the first communication unit 200 to transmit the encrypted information for executing predetermined processing received from the communication terminal 10 to the information processing device 30 (S229).

Note that operations in S231, S233, S235, and S237 are the same as those in S131, S133, S135, and S137 according to the first embodiment, respectively.

—Operations when it is Verified that the Relaying Device 20 is Unauthorized

Note that operations when it is verified that the relaying device 20 is unauthorized in S225 are the same as those according to the first embodiment; therefore, a description thereof is omitted here.

Modification Example

The operations according to the second embodiment are described above; however, the present disclosure is not limited to the above-described operations. For example, the operation in S213 may be performed at any other time as long as the operation is performed before S233; for example, the operation may be performed between S229 and S231.

Further, modification examples described below can also be used. First, in S221, the controller 304 of the information processing device 30 allows the encryption/decryption function unit 308 to encrypt the set of random number keys and the result of the set of random keys corresponding to the set of random number keys, which are newly generated by the information generating unit 302, and the session key, based on the result of the random number 1. Further, the controller 304 allows the communication unit 300 to transmit, to the relaying device 20, the session key, the set of random number keys, and the result of the set of random number keys which are encrypted. Further, in S223, the transmission controller 204 of the relaying device 20 allows the first communication unit 200 to transmit, to the communication terminal 10, the session key, the set of random number keys, and the result of the set of random number keys, which are encrypted and received from the information processing device 30.

According to this modification example, the communication terminal 10 can acquire a new set of random number keys and result of the set of random number keys at the time of settlement. Accordingly, the communication terminal 10 supplies the set of random number keys and the result of the set of random number keys, for example, so that there are effects of making another access to the information processing device 30 unnecessary.

(3-2-3. Effects According to the Second Embodiment)

As described above, according to the second embodiment, the communication terminal 10 allows transmission of the authentication information for authenticating the relaying device 20 to the information processing device 30 via the relaying device 20 based on the random number(s) acquired from the information processing device 30. Further, the communication terminal 10 receives the response to the authentication information by the information processing device 30 via the relaying device 20 and verifies the validity of the relaying device 20 based on the response to the authentication information and the result of the random number(s). Therefore, the communication terminal 10 checks whether the response to the authentication information received from the relaying device 20 is authorized, so that it is possible to determine whether the relaying device 20 is an unauthorized device.

Further, since the relaying device 20 according to the second embodiment does not necessarily include the secure chip 208, a simpler device than the relaying device 20 according to the first embodiment can be used.

Further, the same session key is used for communication between the relaying device 20 and the communication terminal 10 and communication between the information processing device 30 and the relaying device 20. Therefore, it is unnecessary for the relaying device 20 to perform encryption, for example, so that a load on processing in the relaying device 20 can be reduced.

3-3. Third Embodiment

The second embodiment is described above. The third embodiment is as follows. As described below, according to the third embodiment, the communication terminal 10 uses, as the first information, information containing encryption information obtained by encryption of authentication basic information, such as the random number(s), by use of a common key, and identification information of the common key. Further, the communication terminal 10 uses, as the second information, encryption information obtained by encryption of information converted from the authentication basic information, such as "value obtained by adding 1 to the random number(s)", by use of the common key.

(3-3-1. Configuration According to the Third Embodiment)

The information processing device 30 according to the third embodiment includes the same structural elements of the information processing device 30 according to the first embodiment. However, functions of the information generating unit 302 and the key generating unit 310 according to the third embodiment are different from those according to the first embodiment.

The authentication information generating unit 106 according to the third embodiment generates the authentication basic information, such as the random number(s), character information in accordance with a predetermined rule, or an image in accordance with a predetermined rule. Further, the authentication information generating unit 106 generates authentication information for authenticating the relaying device 20 based on the first information. Here, the first information (according to the third embodiment) is information containing encryption information obtained by encryption of the authentication basic information by use of a common key received from the information processing device 30, for example, and identification information of the common key. Further, the second information (according to the third embodiment) is encryption information obtained by encryption of information converted from the authentication basic information, such as "value obtained by adding 1 to the random number(s)", by use of the common key.

Further, the key generating unit 310 according to the third embodiment generates the common key associated with the user's ID received from the communication terminal 10, for example, and also issues a key ID of the common key. Further, the key generating unit 310 generates a predetermined session key used for communication with the relaying device 20.

Note that functions of the other structural elements in the information processing device 30 are the same as those according to the first embodiment.

Further, a configuration of the communication terminal 10 according to the third embodiment is the same as that according to the first embodiment, and a configuration of the relaying device 20 according to the third embodiment is the same as that according to the second embodiment; therefore, a description thereof is omitted here.

(3-3-2. Operations According to the Third Embodiment)
(3-3-2-1. Operations Before Settlement)

Figure 16:
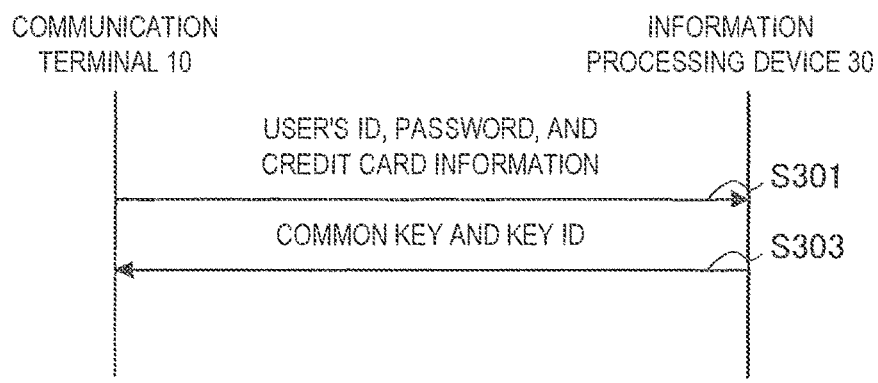
FIG. 16 is a sequence diagram showing operations before settlement according to a third embodiment of the present disclosure.

Operations according to the third embodiment are as follows. First, operations before settlement according to the third embodiment will be described. FIG. 16 is a sequence diagram showing the operations before settlement according to the third embodiment. Note that in the operations before settlement, it is assumed that communication is performed by making communication contents between the communication terminal 10 and the information processing device 30 confidential. Further, an operation in S301 is the same as that in S101 according to the first embodiment.

After S301, the storage 306 of the information processing device 30 stores information received from the communication terminal 10, such as the user's ID, the password, and the credit card information in association with each other.

Next, the key generating unit 310 generates the common key associated with the user's ID and issues the key ID of the common key (identification information of the common key). Here, the controller 304 may allow the storage 306 to store the common key and the key ID, which are generated by the key generating unit 310, and which are associated with the use's ID. Further, the key generation unit 310 may set limitations on the number and/or period of usage of the common key, such as the upper limit of the number of usage by the user or a usage period.

Next, the communication unit 300 transmits the common key and the key ID, which are generated by the key generating unit 310, to the communication terminal 10.

Then, the communication terminal 10 records the received common key and key ID on a recording medium incorporated in the communication terminal 10 or connected thereto (S303). Here, this recording medium may or may not have a tamper-resistant feature. Note that the recording medium may be included in the storage device 156 of the communication terminal 10 or detachably attached to the communication terminal 10.

(3-3-2-2. Operations at the Time of Settlement)

Figure 17:
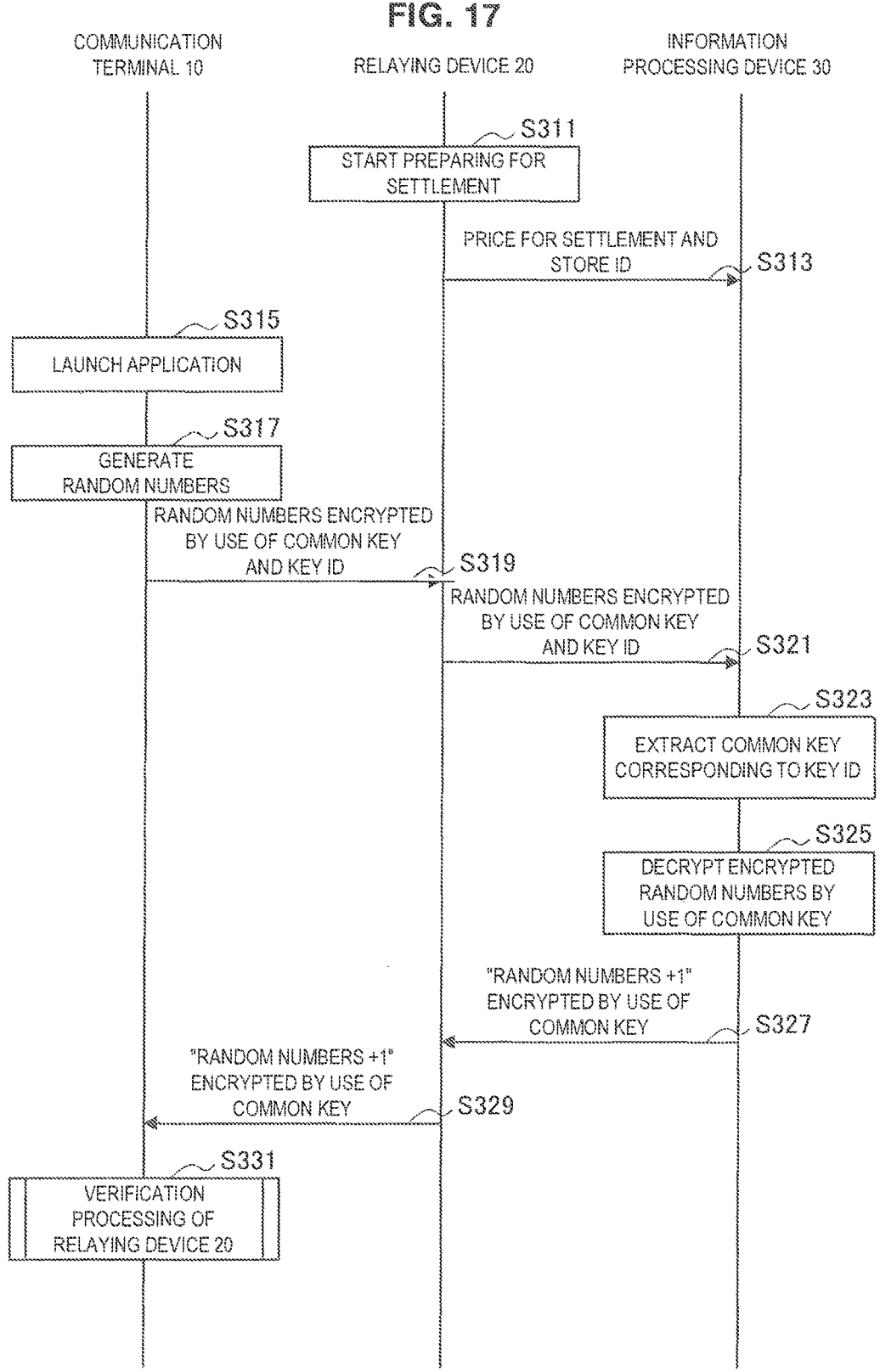
FIG. 17 is a first sequence diagram showing operations at a time of settlement according to the same embodiment.

Operations at the time of settlement according to the third embodiment are as follows. FIG. 17 is a part of a sequence diagram showing the operations at the time of settlement according to the third embodiment. Note that FIG. 17 is a sequence diagram when the relaying device 20 is an authorized device, and here, it is assumed that the relaying device 20 is an authorized device.

Note that operations in S311, S313, and S315 are the same as those in S211, S213, and S215 according to the second embodiment, respectively.

After S315, the authentication information generating unit 106 of the communication terminal 10 generates the authentication basic information, such as the random number(s). Next, the controller 102 allows the storage 102 to store the generated authentication basic information. Then, the authentication information generating unit 106 allows the encryption/decryption function unit 114 to encrypt the generated authentication basic information by use of the common key recorded on the recording medium. Further, the authentication information generating unit 106 sets a combination of the encrypted authentication basic information and the key ID recorded on the recording medium as the authentication information (S317).

Then, the transmission controller 104 allows the first communication unit 100 to transmit the encrypted authentication basic information and the key ID to the relaying device 20 (S319).

Next, the transmission controller 204 of the relaying device 20 allows the first communication unit 200 to transmit the encrypted authentication basic information and the key ID, which are received from the communication terminal 10, to the information processing device 30 (S321).

Then, the controller 304 of the information processing device 30 extracts, from the storage 306, a common key corresponding to the key ID received from the communication terminal 10 (S323). Next, the controller 304 allows the encryption/decryption function unit 308 to decrypt the encrypted authentication basic information received from the relaying device 20 by use of the common key extracted in S323 (S325).

Next, the controller 304 allows the encryption/decryption function unit 308 to encrypt information converted from the decrypted authentication basic information, such as "value obtained by adding 1 to the random number(s) decrypted by the controller 304", by use of the common key. Note that the controller 304 may allow the encryption/decryption function unit 308 to encrypt a value obtained by adding a predetermined number other than "1", such as "10" or "−1", to the random number(s), or to encrypt information in which each character is converted from decrypted character information, for example.

Then, the controller 304 allows the communication unit 300 to transmit the encrypted "information converted from the authentication basic information" as a response to the authentication information to the relaying device 20 (S327).

Next, the transmission controller 204 of the relaying device 20 allows the first communication unit 200 to transmit the response to the authentication information received from the information processing device 30 to the communication terminal 10 (S329).

Then, the verification unit 108 of the communication terminal 10 verifies the validity of the relaying device 20 based on the response to the authentication information received from the relaying device 20 and the common key recorded on the recording medium (S331).

Figure 18:
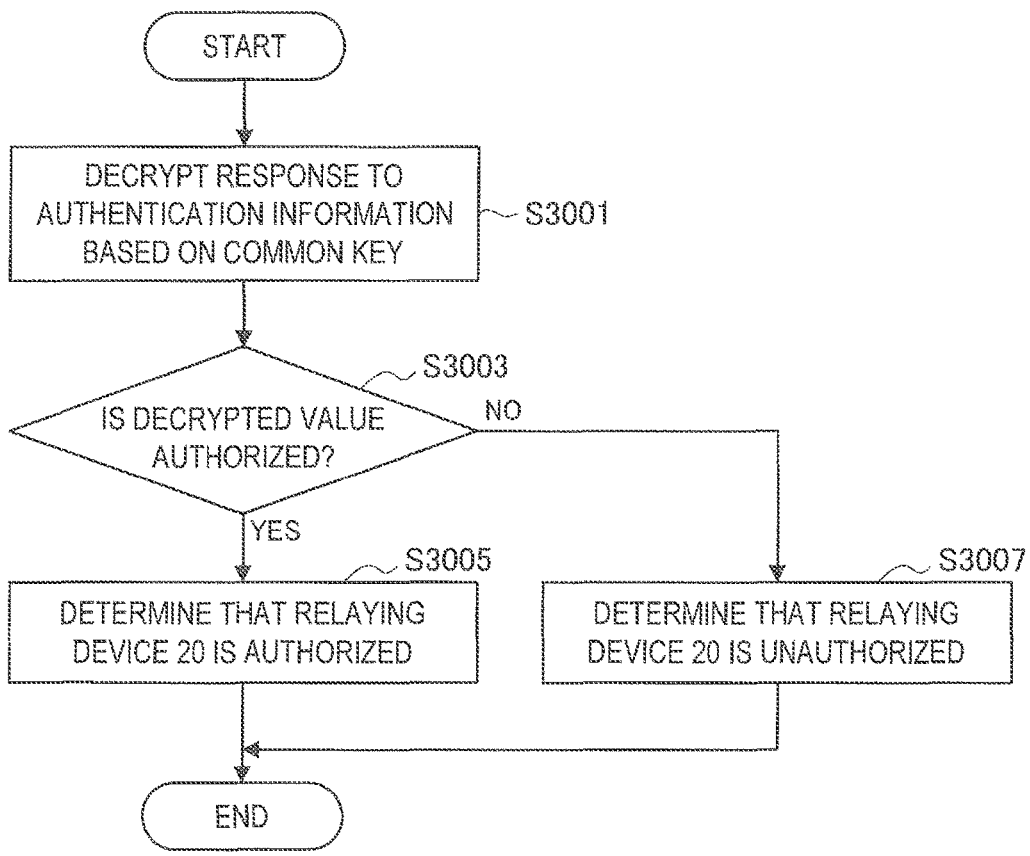
FIG. 18 is a flow chart showing detailed operations in verification processing of a relaying device according to the same embodiment.

Here, detailed operations in S331 will be described with reference to FIG. 18. FIG. 18 is a flow chart showing detailed operations of verification processing of the relaying device 20 in S331.

As shown in FIG. 18, first, the encryption/decryption function unit 114 decrypts the response to the authentication information received from the relaying device 20 based on the common key (S3001). Here, in a case where the relaying device 20 is an authorized device, the communication terminal 10 has received, from the relaying device 20, the "information converted from the authentication basic information" encrypted by use of the common key, as the response to the authentication information. Accordingly, the encryption/decryption function unit 114 can correctly decrypt the encrypted "information converted from the authentication basic information", such as the "value obtained by adding 1 to the random number(s)" in the operation in S3001.

Then, the verification unit 108 determines whether the value decrypted by the encryption/decryption function unit 114 is authorized (S3003). For example, the verification unit 108 may determine whether the value decrypted by the encryption/decryption function unit 114 is the "information converted from the authentication basic information", such as the "value obtained by adding 1 to the random number(s)", stored in the storage 120.

When it is determined that the value decrypted by the encryption/decryption function unit 114 is authorized (S3003: Yes), the verification unit 108 determines that the relaying device 20 is an authorized device (S3005).

In contrast, when it is determined that the value decrypted by the encryption/decryption function unit 114 is unauthorized (S3003: No), the verification unit 108 determines that the relaying device 20 is an unauthorized device (S3007).

Operations when it is Verified that the Relaying Device 20 is Authorized

Operations after S331 are as follows. First, operations when the verification unit 108 verifies that the relaying device 20 is authorized in S331 will be described.

Figure 19:
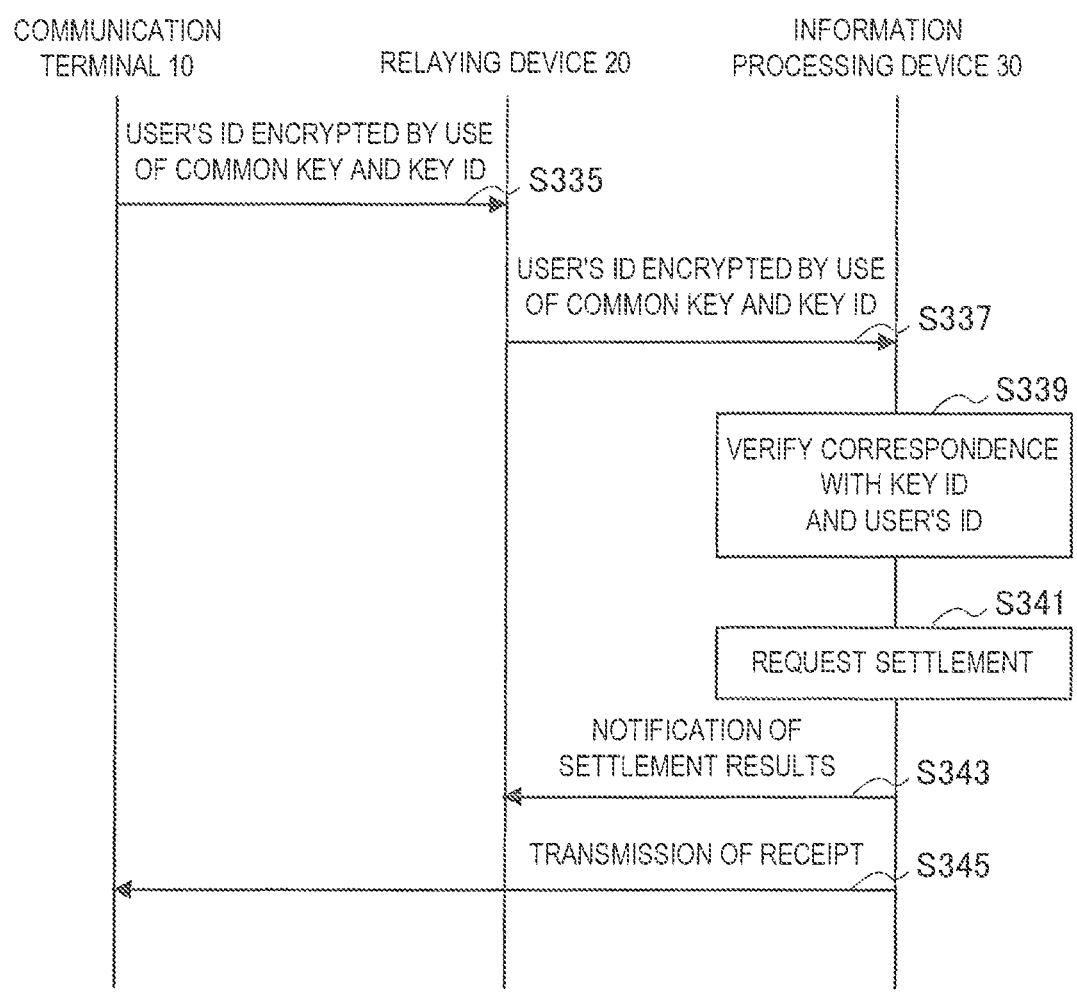
FIG. 19 is a second sequence diagram showing operations at a time of settlement according to the same embodiment.

FIG. 19 is a sequence diagram showing operations when it is verified that the relaying device 20 is authorized in S331. As shown in FIG. 19, first, the encryption/decryption function unit 114 encrypts the information for executing predetermined processing, such as the user's ID, by use of the common key recorded on the recording medium. Further, the transmission controller 104 allows the second communication unit 122 to transmit the information for executing predetermined processing encrypted by the encryption/decryption function unit 114 and the key ID recorded on the recording medium to the relaying device 20 by near field communication, for example (S335).

Next, the transmission controller 204 of the relaying device 20 allows the first communication unit 200 to transmit, to the information processing device 30, the encrypted information for executing predetermined processing and the key ID, which are received from the communication terminal 10 (S337).

Then, the encryption/decryption function unit 308 of the information processing device 30 decrypts the encrypted "information for executing predetermined processing" received from the relaying device 20 by use of the common key. Further, the controller 304 verifies the correspondence with the key ID received from the relaying device 20 and the user's ID decrypted by the encryption/decryption function unit 308, based on a correspondence relation of the key ID and the user's ID which are stored in the storage 306 (S339).

Note that operations in S341, S343, and S345 are the same as those in S133, S135, and S137 according to the first embodiment, respectively.

—Operations when it is Verified that the Relaying Device 20 is Unauthorized

Operations when it is verified that the relaying device 20 is unauthorized in S331 are the same as those according to the first embodiment; therefore, a description thereof is omitted here.

Modification Example

Note that as a modification example of the operations at the time of settlement, in S237, the encryption/decryption function unit 308 of the information processing device 30 may encrypt a common key and a key ID which are newly generated by the key generating unit 310, in addition to the "information converted from the authentication basic information", based on the common key extracted in S323. Further, the controller 304 may allow the communication unit 300 to transmit the encrypted "information converted from the authentication basic information", common key, and key ID, to the relaying device 20.

Further, in S329, the transmission controller 204 of the relaying device 20 may allow the first communication unit 200 to transmit the encrypted "information converted from the authentication basic information", common key, and key ID, which are received from the information processing device 30, to the communication terminal 10.

According to this modification example, the communication terminal 10 can acquire a new common key and key ID at the time of settlement. Accordingly, there are effects of making another access by the communication terminal 10 to the information processing device 30 unnecessary in order to update the common key when the number and/or period of usage of the common key exceed the limitations, for example.

(3-3-3. Effects According to the Third Embodiment)

As described above, according to the third embodiment, the communication terminal 10 allows transmission of the authentication information for authenticating the relaying device 20 based on the common key acquired from the information processing device 30 to the information processing device 30 via the relaying device 20. Further, the communication terminal 10 receives the response to the authentication information by the information processing device 30 via the relaying device 20, and verifies the validity of the relaying device 20 based on the response to the authentication information and the common key. Accordingly, by checking whether the response to the authentication information received from the relaying device 20 is authorized, the communication terminal 10 can determine whether the relaying device 20 is an unauthorized device.

Furthermore, the information processing device 30 stores the user's ID, the common key, and the key ID in association before settlement, and checks the correspondence with the user's ID and the key ID received from the relaying device 20 at the time of settlement. Accordingly, even when a different user acquires the common key in an unauthorized manner, since the information processing device 30 checks the correspondence with the user's ID and the key ID received from the relaying device 20, it is possible to detect unauthorized usage.

4. Modification Example

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A communication terminal including:
a transmission controller configured to allow transmission of, to a verification target device, authentication information for authenticating the verification target device based on first information acquired from an information processing device; and
a verification unit configured to verify validity of the verification target device based on a response to the authentication information and second information acquired from the information processing device, the second information being associated with the first information.

(2) The communication terminal according to (1), wherein the first information and the second information each have a limitation on at least one of a number and a period of usage.

(3) The communication terminal according to (1) or (2), wherein the first information and the second information are recorded on a non-tamper-resistant recording medium.

(4) The communication terminal according to (1) or (2), wherein the first information and the second information are recorded on a tamper-resistant recording medium.

(5) The communication terminal according to any one of (1) to (4), wherein the first information is one or more random numbers and the second information is information associated with the one or more random numbers.

(6) The communication terminal according to any one of (1) to (4), wherein the first information is information containing encryption information obtained by encryption of authentication basic information by use of a common key, and identification information of the common key, and the second information is encryption information obtained by encryption of information by use of the common key, the information being converted from the authentication basic information.

(7) The communication terminal according to any one of (1) to (6), wherein, when the verification unit verifies that the verification target device is authorized, the transmission controller allows the information processing device to transmit information for executing predetermined processing to the verification target device.

(8) The communication terminal according to (7), wherein, when the verification unit verifies that the verification target device is unauthorized, the transmission controller does not allow transmission of the information for executing predetermined processing to the verification target device.

(9) The communication terminal according to (7), wherein, when the verification unit verifies that the verification target device is unauthorized, the transmission controller allows transmission of reporting information for reporting a verification result of the verification target device to an external device.

(10) The communication terminal according to (9), wherein the reporting information contains at least one of position information of the communication terminal, a life log, and an image captured by the communication terminal.

(11) The communication terminal according to (7), further including: a display unit configured to notify a user of the communication terminal about a verification result of the verification target device when the verification unit verifies that the verification target device is unauthorized.

(12) The communication terminal according to any one of (1) to (11),
wherein the verification target device is a relaying device configured to relay between the communication terminal and the information processing device,
wherein the verification target device and the communication terminal are configured to communicate with each other by use of a first session key,
wherein the information processing device and the verification target device are configured to communicate with each other by use of a second session key, and
wherein the first session key is different from the second session key.

(13) The communication terminal according to any one of (1) to (11),
wherein the verification target device and the communication terminal are configured to communicate with each other by use of a first session key,
wherein the information processing device and the verification target device are configured to communicate with each other by use of a second session key, and
wherein the first session key is same as the second session key.

(14) The communication terminal according to (12) or (13), wherein the first session key is associated with the first information and the second information.

(15) A communication method including:
allowing transmission of, to a verification target device, authentication information for authenticating the verification target device based on first information acquired from an information processing device; and
verifying validity of the verification target device based on a response to the authentication information and second information acquired from the information processing device, the second information being associated with the first information.

(16) A communication method including:
allowing, by a communication terminal, transmission of, to a verification target device, authentication information for authenticating the verification target device based on first information acquired from an information processing device;
verifying, by the communication terminal, validity of the verification target device based on a response to the authentication information and second information acquired from the information processing device, the second information being associated with the first information;
allowing, by the communication terminal, the information processing device to transmit information for executing predetermined processing to the verification target device when it is verified that the verification target device is authorized; and
allowing, by the verification target device, transmission of the information for executing predetermined processing to the information processing device.

(17) A program for causing a computer to function as:
a transmission controller configured to allow transmission of, to a verification target device, authentication information for authenticating the verification target device based on first information acquired from an information processing device; and a verification unit configured to verify validity of the verification target device based on a response to the authentication information and second information acquired from the information processing device, the second information being associated with the first information.

(18) A communication system including:
a communication terminal;
a verification target device; and
an information processing device,
wherein the communication terminal includes,
a transmission controller configured to allow transmission of, to the verification target device, authentication information for authenticating the verification target device based on first information acquired from the information processing device; and
a verification unit configured to verify validity of the verification target device based on a response to the authentication information by the verification target device and second information acquired from the information processing device, the second information being associated with the first information,
wherein the transmission controller allows the information processing device to transmit information for executing predetermined processing to the verification target device when the verification unit verifies that the verification target device is authorized, and wherein the verification target device includes,
a transmission controller configured to allow transmission of the information for executing predetermined processing to the information processing device.

(19) A communication system including:
a communication terminal;
a verification target device; and
an information processing device,
wherein the communication terminal includes,
a transmission controller configured to allow transmission of, to the verification target device, authentication information for authenticating the verification target device based on first information acquired from the information processing device; and
a verification unit configured to verify validity of the verification target device based on a response to the authentication information by the information processing device and second information acquired from the information processing device, the second information being associated with the first information,
wherein the transmission controller allows the information processing device to transmit information for executing predetermined processing to the verification target device when the verification unit verifies that the verification target device is authorized, and
wherein the verification target device includes,
a transmission controller configured to allow transmission of the authentication information and the information for executing predetermined processing to the information processing device.

What is claimed is:

1. A communication terminal, comprising:
a communication unit configured to:
communicate with an information processing device; and
receive first information and second information associated with the first information from the information processing device;
a global positioning system (GPS) receiving circuit configured to detect a position of the communication terminal; and
a controller configured to:
verify validity of a verification target device based on the first information and the second information; and
execute a settlement process based on the verification of the validity of the verification target device and the detected position.

2. The communication terminal according to claim 1, wherein the first information has a limitation on at least one of a number or a period of usage.

3. The communication terminal according to claim 2, wherein the controller is further configured to:
transmit, based on the first information, authentication information to the verification target device for authentication of the verification target device; and
verify the validity of the verification target device based on a response to the authentication information.

4. The communication terminal according to claim 3, wherein the first information is recorded on a non-tamper-resistant recording medium.

5. The communication terminal according to claim 3, wherein the first information is recorded on a tamper-resistant recording medium.

6. The communication terminal according to claim 3, wherein the first information includes a plurality of random numbers.

7. The communication terminal according to claim 3, wherein
the first information comprises identification information of a common key and encryption information obtained by encryption of authentication basic information,
the encryption of the authentication basic information is based on the common key, and
the first information is converted from the authentication basic information.

8. The communication terminal according to claim 3, wherein the controller is further configured to:
transmit third information to the verification target device based on the verification of the validity of the verification target device; and
execute the settlement process based on the transmission of the third information.

9. The communication terminal according to claim 3, wherein the controller is further configured to:
verify the verification target device is unauthorized based on the second information; and
prohibit transmission of third information to the verification target device based on the verification that the verification target device is unauthorized.

10. The communication terminal according to claim 3, wherein the controller is further configured to:
verify the verification target device is unauthorized based on the second information; and
transmit reporting information to an external device based on the verification that the verification target device is unauthorized.

11. The communication terminal according to claim 10, wherein the reporting information contains at least one of position information of the communication terminal, a life log, or an image captured by the communication terminal.

12. The communication terminal according to claim 3, further comprising a display unit configured to display a verification result of the verification target device that indicates the verification target device is unauthorized.

13. The communication terminal according to claim 3, wherein
- the verification target device is a relaying device configured to relay between the communication terminal and the information processing device,
- the verification target device and the communication terminal are configured to communicate with each other by use of a first session key,
- the information processing device and the verification target device are configured to communicate with each other by use of a second session key, and
- the first session key is different from the second session key.

14. The communication terminal according to claim 3, wherein
- the verification target device and the communication terminal are configured to communicate with each other by use of a first session key,
- the information processing device and the verification target device are configured to communicate with each other by use of a second session key, and
- the first session key is same as the second session key.

15. The communication terminal according to claim 14, wherein the first session key is associated with the first information.

16. A communication method, comprising:

in a communication terminal:
- communicating with an information processing device;
- receiving first information and second information associated with the first information from the information processing device;
- detecting a position of the communication terminal;
- verifying validity of a verification target device based on the first information and the second information; and
- executing a settlement process based on the verification of the validity of the verification target device and the detected position.

* * * * *